US008892747B2

(12) United States Patent
Laumen et al.

(10) Patent No.: US 8,892,747 B2
(45) Date of Patent: Nov. 18, 2014

(54) MANAGEMENT OF DYNAMIC GROUPS IN A COMMUNICATION SYSTEM

(71) Applicants: Josef Laumen, Munich (DE); Holger Schmidt, Braunschweig (DE); Norbert Schwagmann, Braunschweig (DE); Frank Kowalewski, Unterhaching (DE)

(72) Inventors: Josef Laumen, Munich (DE); Holger Schmidt, Braunschweig (DE); Norbert Schwagmann, Braunschweig (DE); Frank Kowalewski, Unterhaching (DE)

(73) Assignee: Intel Mobile Communications GmbH, Neubiberg (DE)

( * ) Notice: Subject to any disclaimer, the term of this patent is extended or adjusted under 35 U.S.C. 154(b) by 0 days.

(21) Appl. No.: 13/926,271

(22) Filed: Jun. 25, 2013

(65) Prior Publication Data

US 2013/0288736 A1 Oct. 31, 2013

Related U.S. Application Data

(63) Continuation of application No. 11/816,569, filed as application No. PCT/DE2006/000097 on Jan. 23, 2006, now abandoned.

(30) Foreign Application Priority Data

Feb. 17, 2005 (DE) .......................... 10 2005 007 342
Nov. 11, 2005 (DE) .......................... 10 2005 053 914

(51) Int. Cl.
*H04W 4/08* (2009.01)
*H04W 84/08* (2009.01)
*H04W 8/18* (2009.01)

(52) U.S. Cl.
CPC . *H04W 4/08* (2013.01); *H04W 8/18* (2013.01); *H04W 84/08* (2013.01)

USPC ........................... 709/227; 455/518; 709/204

(58) Field of Classification Search
USPC .................................... 709/204, 227; 455/518
See application file for complete search history.

(56) References Cited

U.S. PATENT DOCUMENTS 6,253,091 B1 6/2001 Naddell et al.
6,363,258 B1 * 3/2002 Schmidt et al. ............... 455/514
6,484,037 B1 * 11/2002 Schmidt et al. ............... 455/514
6,516,200 B1 * 2/2003 Schmidt et al. ............... 455/518

(Continued)

FOREIGN PATENT DOCUMENTS

EP 1 587 332 A1 10/2005
JP 2004-274693 9/2004

(Continued)

OTHER PUBLICATIONS

3GPP TS 22.250 V6.0.0 (Dec. 2002); *Technical Specification*; 3rd Generation Partnership Project; Technical Specification Group Services and System Aspects; IP Multimedia Subsystem (IMS) group management; Stage 1 (Release 6).
List Management and Do-Not-Disturb V2.0.6 (Jun. 2006); *Technical Specification*; Push to Talk over Cellular (PoC); List Management and Do-not-Disturb; PoC Release 2.

(Continued)

*Primary Examiner* — Kostas Katsikis
(74) *Attorney, Agent, or Firm* — Schwabe, Williamson & Wyatt, P.C.

(57) ABSTRACT

A communication system in which a communication service client terminal specifies a criterion, with further communication service client terminals which meet the criterion being able to be participants in a communication service which is provided. A server computer is configured to produce a list of the further communication service client units which meet the criterion and to transmit the list.

23 Claims, 10 Drawing Sheets

(56) References Cited

U.S. PATENT DOCUMENTS

| | | | |
|---|---|---|---|
| 6,738,617 | B2 | 5/2004 | Rosen et al. |
| 6,788,946 | B2 * | 9/2004 | Winchell et al. ............ 455/459 |
| 7,245,927 | B2 * | 7/2007 | Hansen ......................... 455/461 |
| 7,463,901 | B2 * | 12/2008 | Svedberg et al. ............ 455/518 |
| 7,539,160 | B2 * | 5/2009 | Virtanen et al. ............. 370/329 |
| 7,633,914 | B2 * | 12/2009 | Shaffer et al. ................ 370/338 |
| 7,636,339 | B2 * | 12/2009 | Shaffer et al. ................ 370/338 |
| 7,640,293 | B2 * | 12/2009 | Wilson et al. ................ 709/203 |
| 2002/0107008 | A1 | 8/2002 | Hendrey et al. |
| 2002/0151321 | A1 * | 10/2002 | Winchell et al. ............ 455/519 |
| 2004/0177377 | A1 | 9/2004 | Lin et al. |
| 2004/0203907 | A1 | 10/2004 | Hiller et al. |
| 2005/0186970 | A1 | 8/2005 | Yates et al. |
| 2005/0220079 | A1 * | 10/2005 | Asokan ......................... 370/352 |
| 2005/0233776 | A1 | 10/2005 | Allen et al. |
| 2005/0239485 | A1 * | 10/2005 | Kundu et al. ................ 455/519 |
| 2006/0003784 | A1 | 1/2006 | Chion et al. |
| 2006/0046758 | A1 * | 3/2006 | Emami-Nouri et al. ...... 455/518 |
| 2009/0274090 | A1 * | 11/2009 | Akhtar et al. ................ 370/328 |

FOREIGN PATENT DOCUMENTS

| | | |
|---|---|---|
| TW | 527377 | 4/2003 |
| WO | WO-00/16209 A1 | 3/2000 |
| WO | WO-01/50370 A2 | 7/2001 |
| WO | WO-02/103570 A1 | 12/2002 |
| WO | WO-2004-098094 | 11/2004 |

OTHER PUBLICATIONS

RFC 2616 (RFC2616) Internet RFC/STD/FYI/BCP Archives; RFC 2616—Hypertext Transfer Protocol—HTTP/1.1.

J. Rosenberg, et al.; Network Working Group, Request for Comments: 3261, Obsoletes: 2543, Category: Standard Track; "SIP: Session Initiation Protocol"; Jun. 2002.

A.B. Roach; Network Working Group, Request for Comments: 3265, Updates: 2543, Category: Standards Track; "Session Initiation Protocol (SIP)—Specific Event Notification"; Jun. 2002.

B. Campbell, Ed, et al.; Network Working Group, Request for Comments: 3248, Category: Standards Track; "Session Initiation Protocol (SIP) Extension for Instant Messaging"; Dec. 2002.

J. Rosenberg; Network Working Group, Request for Comments: 3311, Category: Standards Track; "The Session Initiation Protocol (SIP) Update Method"; Sep. 2002.

S. Donovan; Network Working Group, Request for Comments: 2976, Category: Standards Track; "The SIP Info Method"; Oct. 2000.

OMA Open Mobile Alliance: "Push to talk over Cellular (PoC)—Architecture Draft Version 1.0 Open Mobile Alliance OMA-AD_PoC-V1_0-20041117-D"; Nov. 2004.

3GPP TR 23.979 V1.0.0 (Jun. 2006); *Technical Report*; 3rd Generation Partnership Project; Technical Specification Group Services and System Aspects; 3GPP enablers for OMA PoC Services; Stage 2 (Release 6).

English translation of Chinese Office Action issued for corresponding Chinese Application No. 200680005304.0, dated Apr. 13, 2010.

* cited by examiner

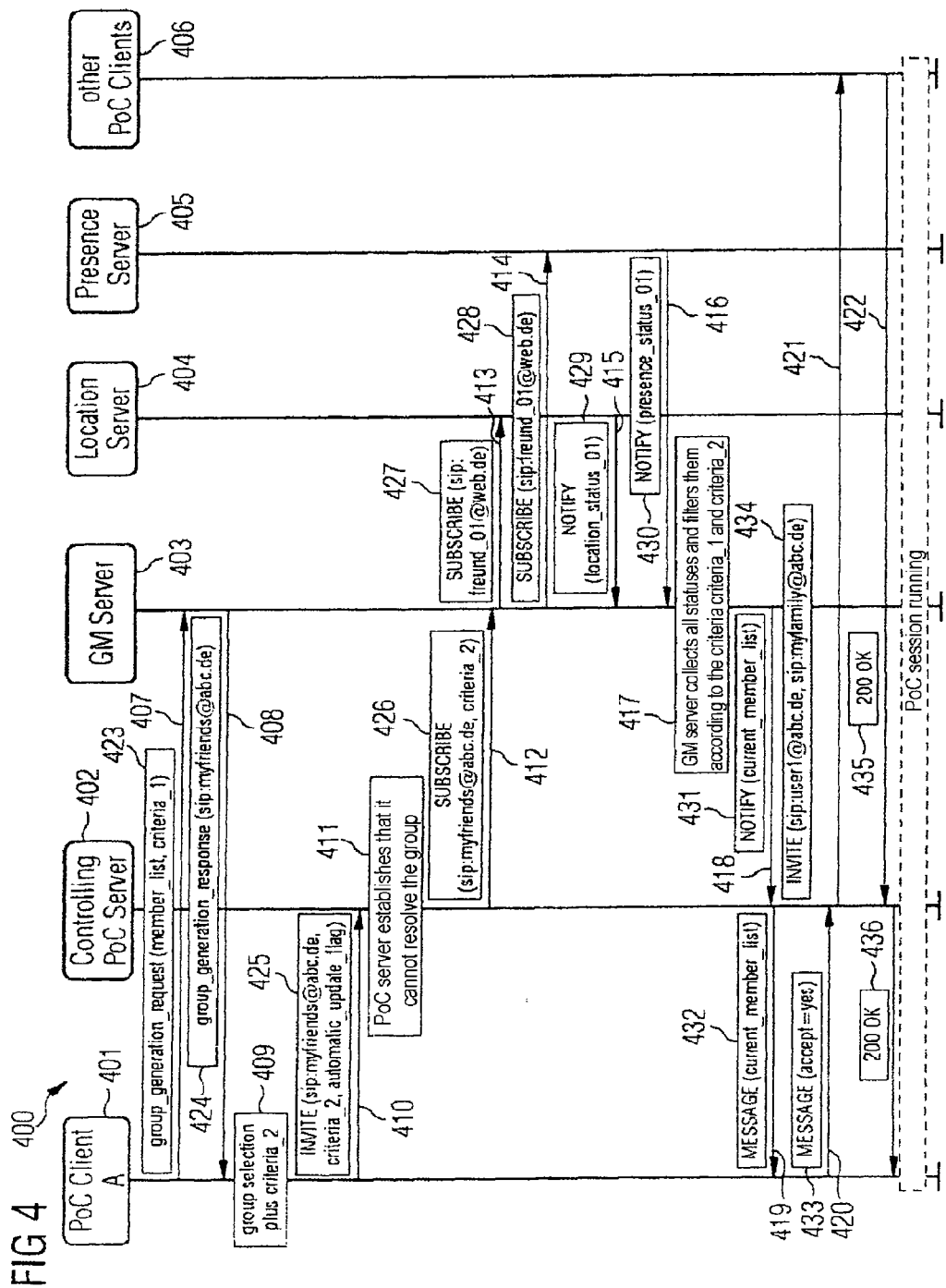

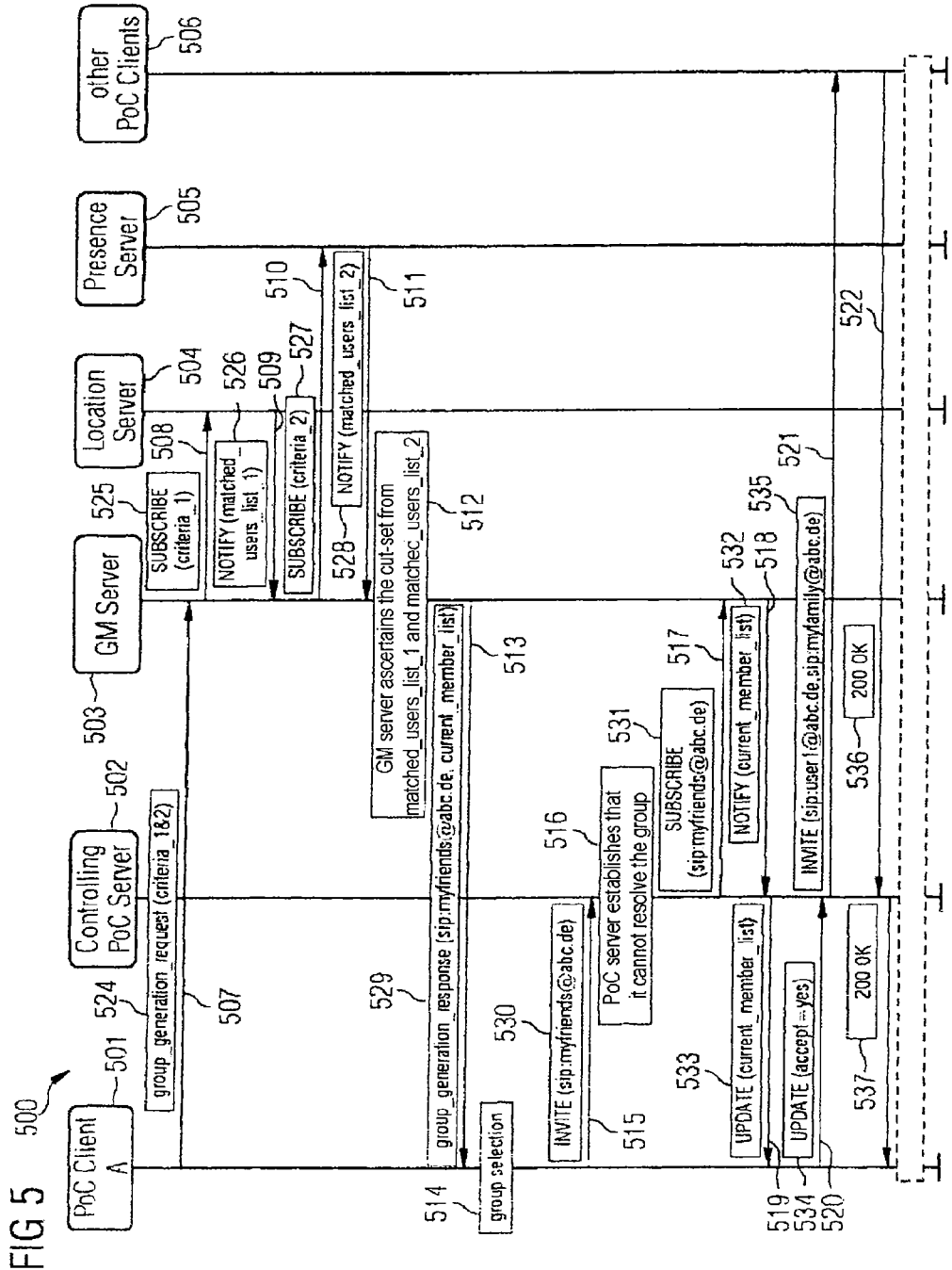

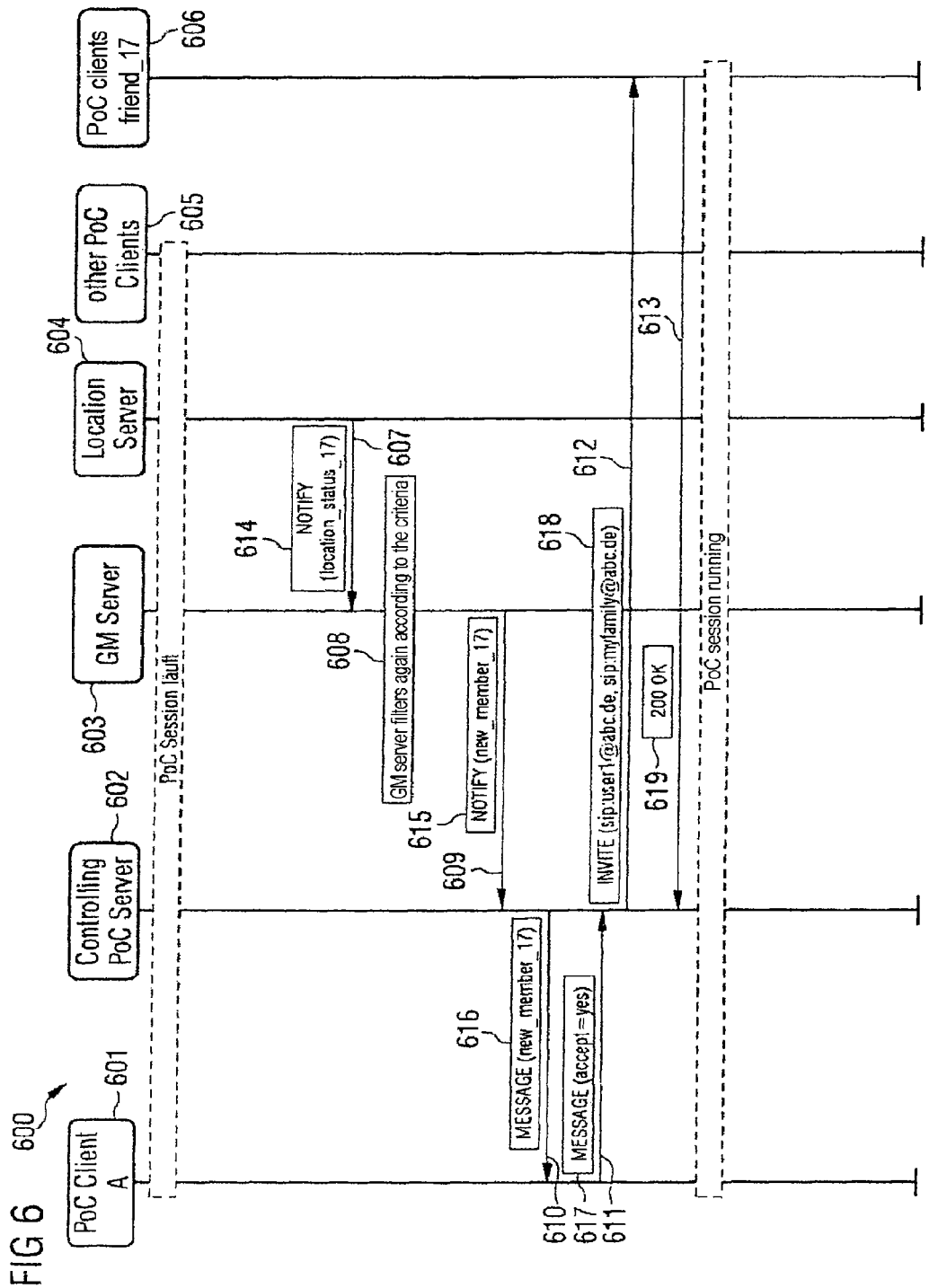

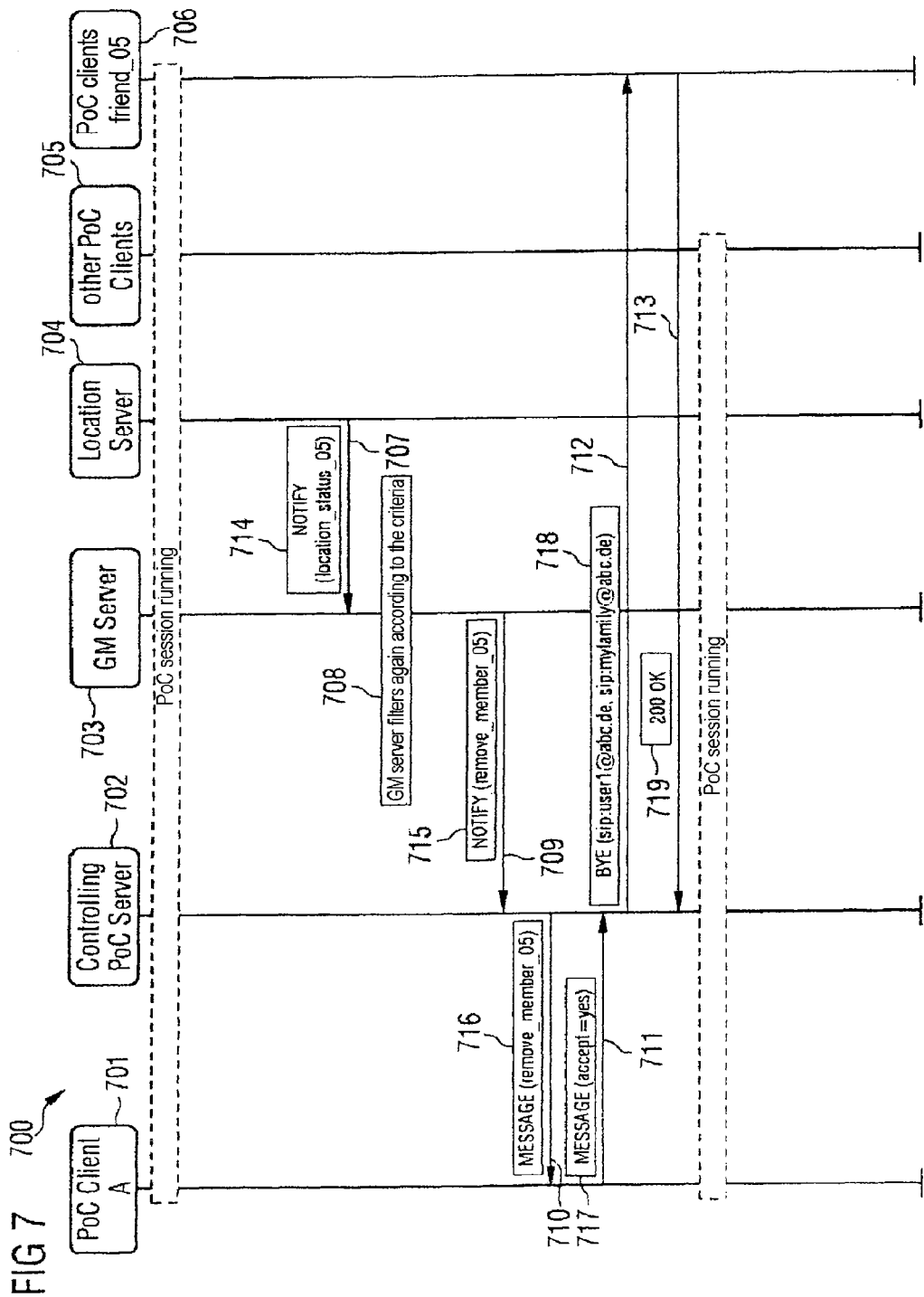

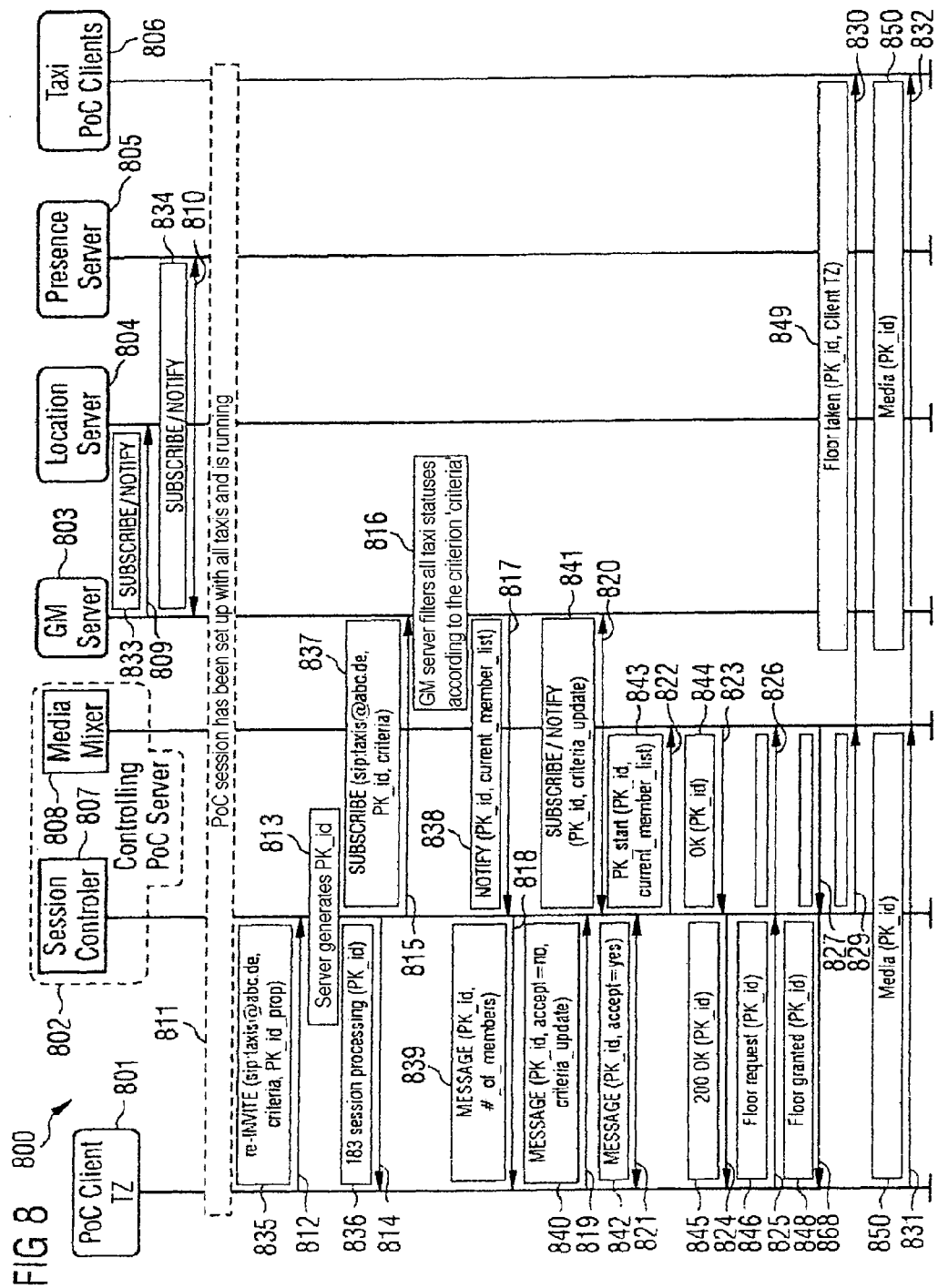

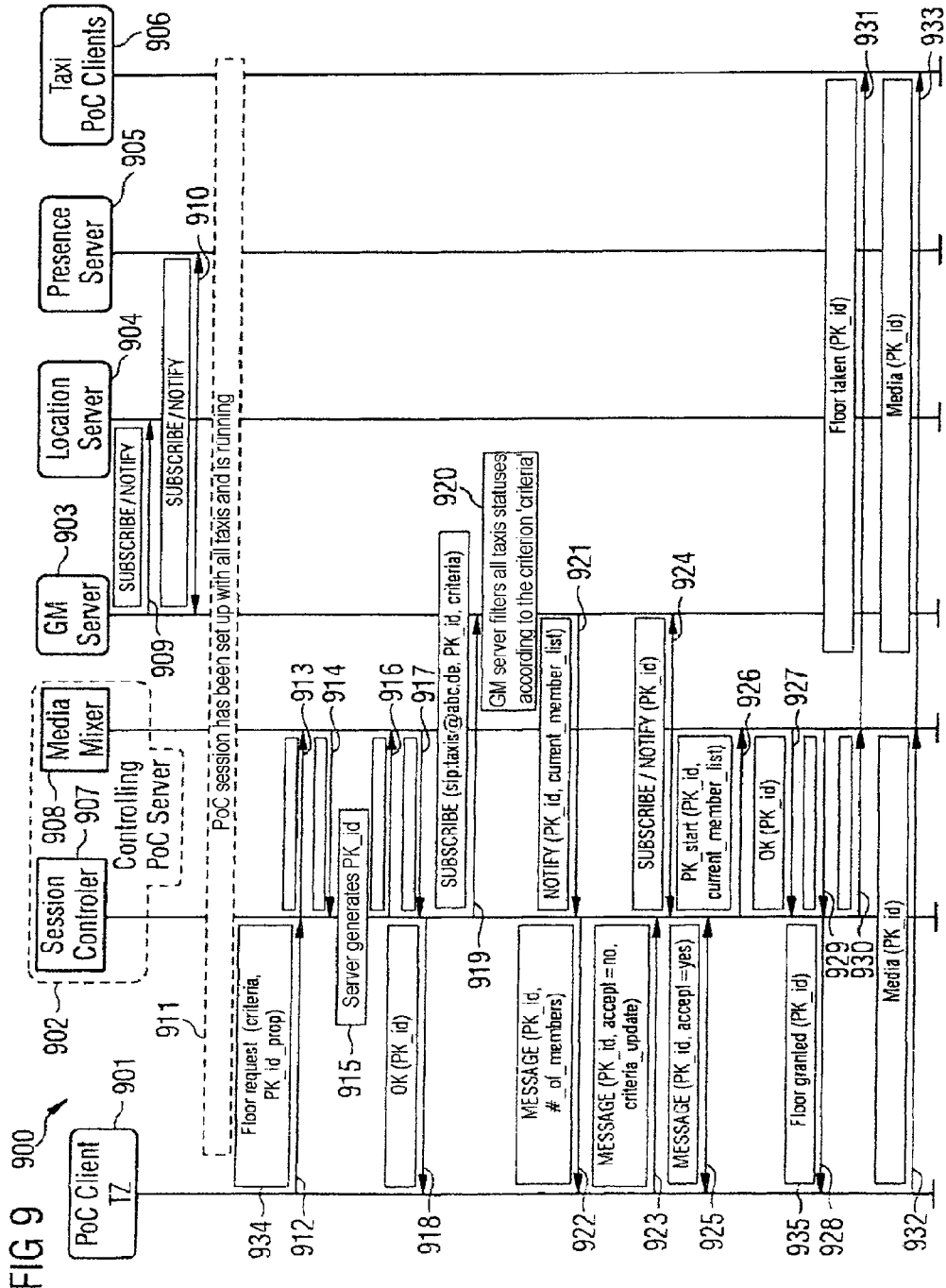

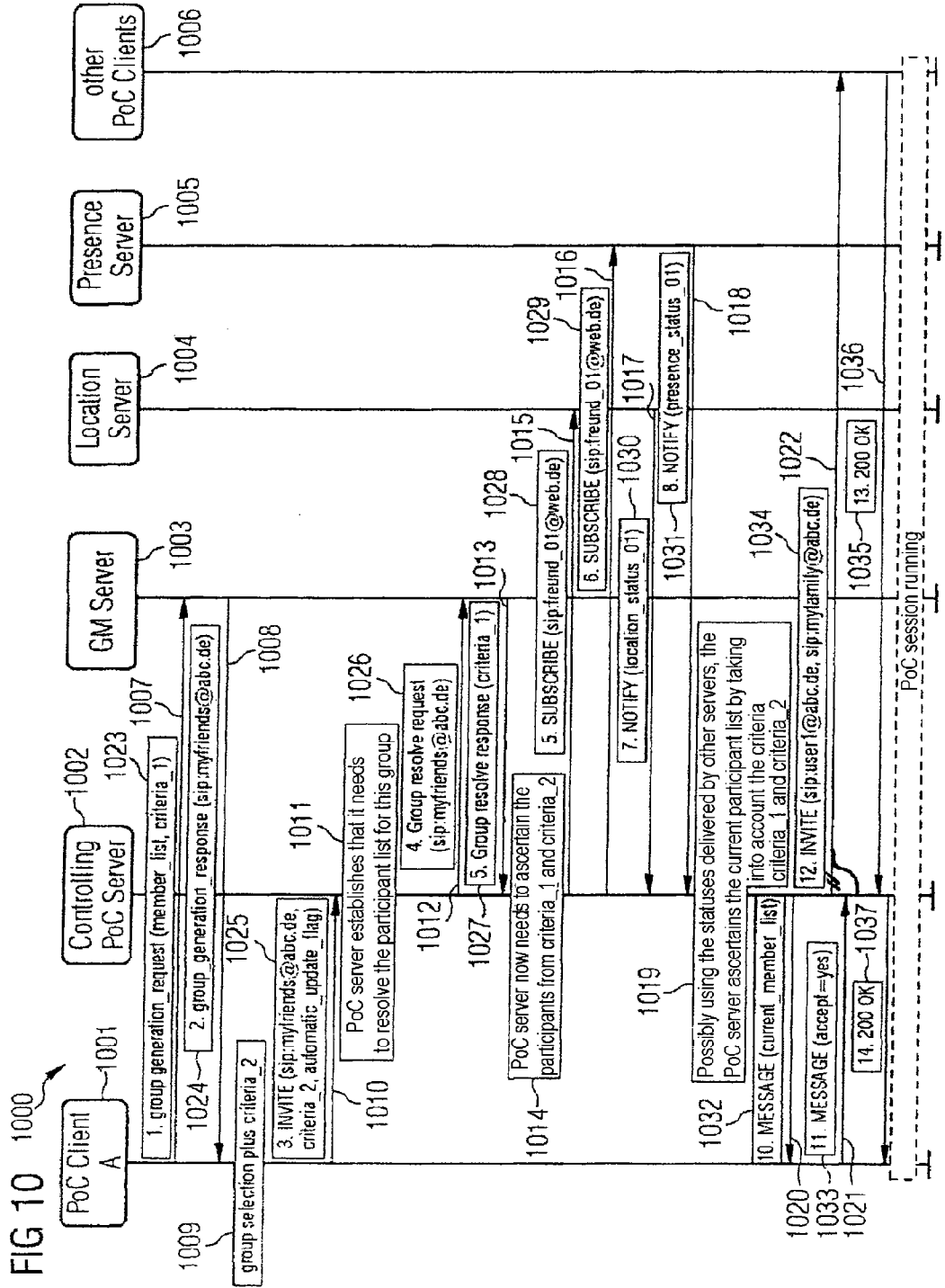

MANAGEMENT OF DYNAMIC GROUPS IN A COMMUNICATION SYSTEM

CROSS-REFERENCE TO RELATED APPLICATION

This application is a continuation of Ser. No. 11/816,569, filed Aug. 17, 2007, which claims priority to international patent application PCT/DE2006/000097, filed Jan. 23, 2006, which published in German on Aug. 24, 2006, as WO/2006/086939, and which claims priority to DE 10 2005 007 342.5, filed Feb. 17, 2005 and DE 10 2005 053 914.9, filed Nov. 11, 2005, all of which are incorporated herein by reference in their entireties.

BACKGROUND OF THE INVENTION

The invention relates to a communication system, a method for operating a communication system, a server unit, a method for operating a server unit, a communication service client unit and a method for operating a communication service client unit.

The communication service Push-to-talk-over-Cellular (PoC) allows a user of a mobile radio participant terminal to transmit voice data to one or more receivers simultaneously.

For this, there is typically a special PoC key on the mobile radio participant terminal which, when operated, allows the user to start to input voice data.

The voice data are usually distributed, that is to say transmitted to the desired receiver(s), using a mobile radio communication network while they are actually being input. This process is called "streaming".

Transmission takes place using the half-duplex method, that is to say that during the voice input and during the transmission, only the sender, that is to say the user who is inputting and sending the voice data, can transmit voice data to the receivers, but the receivers cannot simultaneously send voice data to the sender. In particular, the sender cannot be interrupted by the receivers.

Clearly, communicating using PoC is equivalent to conventional CB radio from the user's standpoint, but with the extension that the sender can transmit voice data worldwide to receivers, who can be reached using the suitable switching technology of at least one mobile radio communication network.

If a user of PoC wishes to send voice messages to the same receiver relatively often, PoC allows him to define personal, fixed user groups. By way of example, a user of PoC can define a group labelled "friends", containing relevant members and their respective address, for example an SIP-URL (Session Initiation Protocol Uniform Resource Locator) in the form of a telephone number or in the form of an SIP address.

This group can then be assigned its own group address in the form of an SIP-URL, and when a PoC session is set up, that is to say a communication session using PoC, by indicating the group address initiated by a user all members of the group are addressed by a PoC server computer and are invited to join the PoC session.

The prerequisite for a member of the group being able to be invited is that the member is registered, that is to say "online", in the mobile radio communication network which is being used to provide the PoC used.

Users of PoC who are involved in a PoC session actively, that is to say as senders, or passively, that is to say as receivers, are subsequently called PoC participants in the PoC session.

Group management, as described in 3GPP TS 22.250 V6.0.0 (2002-12), "IP Multimedia Subsystem (IMS) group management" and Push to Talk over Cellular (PoC); List Management and Do-not-Disturb; PoC Release 2.0, allows simple handling of groups within the context of PoC. Alternatively, groups can be used within the context of other communication services. By way of example, a user can use an appropriate group to send an MMS (Multimedia Message Service) message to all members of his family.

In the case of PoC, a user can use an appropriate group to start a PoC session with all the members of his skat club, for example. To this end, a PoC communication network, i.e. a communication network providing PoC, contains a group management server (GM server) which the user can use to create and manage a group. The user is called the administrator of the group.

In line with the prior art, the main components of the specification of a group are as follows:
  Group identifier: this is used to provide the group with unique identification. By way of example, its form is sip:myfriends@myname.t-mobile.de
  Group specific attributes: these attributes specify more precise properties for the group. These are:
    Group information: information in the form of a simple text (for example "This is my family")
    Group visibility: this specifies which users can find the group (for example using a search function on the GM server). By way of example, the group visibility specifies that only the administrator of the group can find the group.
    Group duration: this specifies for how long and/or when the group is valid or can be used. By way of example, group duration may specify that the group of "football stadium friends" for a user can be used only on Saturdays between 2 o'clock and 6 o'clock pm.
    Service specific info: this is information specific to the communication service within whose context the group can be used. By way of example, within the context of PoC, there is a distinction between "pre-arranged groups" and "chat groups". Thus, if the group is to be used within the context of PoC, the service specific info can be used to indicate what type of group is involved.
  Group members: this is a list of users for such groups belonging to the group, that is to say of group members. Each group member, which may itself be a group, in particular, is clearly specified by means of an ID (identifier, for example an SIP URI). In addition, the following attributes may be stipulated for each group member:
    Member rights: these specify the rights of the group member
    Anonymity: this specifies whether or not the group member is anonymous during communication within the group
    Service specific info: this is information specific to the communication service. In the case of PoC, for example, the function of a moderator of a PoC session can be allocated to a group member using the service specific info.

A user with the relevant right, for example the administrator of a group, can in line with the prior art, perform the following group management operations as part of group management for the group:
  Manipulation of groups
    Get a list of groups
    Create a new group
    Delete a group
    Modify group attributes Manipulation of members in a group
  Get a list of members
  Add a member to a group
  Delete a member from a group
  Modify member attributes Within the context of PoC, a group is used by a user in the following manner, for example, as explained with reference to FIG. 1.

FIG. 1 shows a message flow diagram 100 based on the prior art.

In step 106, the user, taken as the user of a first PoC client unit 101, creates a group (PoC group), to which a second PoC client unit 102 (or the relevant user) and a third PoC client unit 103 (or the relevant user) belong, in a GM server computer 104 by sending a first message 120. By way of example, the PoC group is allocated the ID (identifier) sip:myfriends@abc.de, and the user is notified of this by means of a second message 121, which is sent to the first PoC client unit 101 by the GM server computer 104 in step 107.

In step 108, the user selects the PoC group. In step 109, the user starts a PoC session with the PoC group. To this end, he uses the first PoC client unit 101 to send a third message 122 to a PoC server computer 105. In step 110, the PoC server computer 105 establishes that the ID specified in the third message 122 (sip:myfriends@abc.de) specifies a PoC group. The PoC server computer 105 then sends a fourth message 123 to the GM server computer 104 in step 111 in order to resolve this PoC group, i.e. in order to ascertain which group members are part of this PoC group. The GM server computer 104 then uses a fifth message 124 in step 112 to send a list of all the group members in the PoC group to the PoC server computer. In this example, the group contains the second PoC client unit 102 and the third PoC client unit 103.

By sending a sixth message 125 in step 113 to the second PoC client unit 102 and by sending a seventh message 126 to the third PoC client unit 103, the PoC server computer 105 invites all members of the PoC group to join the PoC session which is to be set up. As soon as the first group member accepts the invitation in step 114 using an eighth message 127, in this example the second PoC client unit 102, a ninth message 128 is sent in step 116 to the initiator of the PoC session, i.e. to the first PoC client unit 101, signalling that the PoC session has now started and that voice packets can be sent within the context of the PoC session.

In line with the prior art, when a group is defined, for example when a group is created in a GM server, the members of the group need to be listed. Particularly the stipulation of which members the group contains is very static. In the case of a group which contains all the members of a user's family as group members, this is not a serious drawback, since the members of a user's family do not change very often.

In the case of a taxi operator, for example, wishing to create a user group whose group members are all his associated taxis (or the relevant drivers) which are currently free, it is very inconvenient to perform the group management operation "Add a member to the group" or "Delete a member from the group" on the GM server computer as soon as a taxi becomes free or comes into service.

Besides the considerable complexity for the taxi operator and a resultant low level of user friendliness, this leads to a very high volume of signalling traffic for the messages to the GM server, for example on the air interface of a mobile radio communication system used for communication.

In addition, the information for deciding who is currently in turn to be a member of a group may not be available to the user (for example in his radio mobile participant terminal). The user may need to go to considerable lengths to ascertain this information.

In the case of a taxi operator, the taxi operator (or his mobile radio participant terminal, for example) needs to be notified every time a taxi becomes free or comes into service, so that the taxi operator always has the current level of information. Constant transmission of notification messages likewise results in a very high volume of signalling traffic, for example on the air interface of the mobile radio communication system used for communication.

Group management operations using HTTP are described in Push to Talk over Cellular (PoC); List Management and Do-not-Disturb; PoC Release 2.0. HTTP get instructions are described in RFC "Hypertext Transfer Protocol—HTTP/1.1".

RF3261 "SIP: Session Initiation Protocol" describes SIP INVITE, RFC3265 "Session Initiation Protocol (SIP)-Specific Event Notification" describes SIP SUBSCRIBE and RFC3428 "Session Initiation Protocol (SIP) Extension for Instant Messaging", describes SIP MESSAGE. These are methods based on the SIP (Session Initiation Protocol).

WO 00/16209 describes a method for exchanging e-mails in which a user can register with a server and can indicate criteria specifying those other users to which e-mails he has sent are to be sent and can indicate a profile which is used to decide whether e-mails sent by other users are sent to him.

WO 02/103570 A1 discloses a network-based system and a method for dynamically managing user groups. Periodically dynamic user data are compared with group membership criteria in order to determine the user groups.

US 2002/0107008 A1 discloses a communication system in which a communication terminal selects the participants in a communication session from a list of possible participants in the communication session on the basis of a geographical distance criterion.

US 2004/0203907 A1 discloses a communication system in which the participants in a communication session are selected from a group of possible participants in the communication session on the basis of the geographical locations at which the possible participants are respectively located.

SUMMARY OF THE INVENTION

A communication system including a communication service client unit, further communication service client units, a communication service server unit, and a server unit. The communication service client unit is configured to produce one or more messages which contain at least one criterion which is respectively met or not met by the further communication service client units and contain a request for provision of a communication service and a specification that the further communication service client units which meet the criterion can be participants in the communication service provided. The server unit is configured to produce a list of the further communication service client units which meet the criterion and to transmit the list to the communication service server unit. The communication service server unit is configured to provide the communication service using the communication service client unit and the further communication service client units which meet the criterion as participants.

BRIEF DESCRIPTION OF THE DRAWINGS

Exemplary embodiments of the invention are illustrated in the figures and are explained in more detail below.

FIG. 4 shows a message flow diagram based on an exemplary embodiment of the invention.

FIG. 5 shows a message flow diagram based on an exemplary embodiment of the invention.

FIG. 6 shows a message flow diagram based on an exemplary embodiment of the invention.

FIG. 7 shows a message flow diagram based on an exemplary embodiment of the invention.

FIG. 8 shows a message flow diagram based on an exemplary embodiment of the invention.

FIG. 9 shows a message flow diagram based on an exemplary embodiment of the invention.

FIG. 10 shows a message flow diagram based on a further exemplary embodiment of the invention.

DETAILED DESCRIPTION OF THE INVENTION

Figure 1:
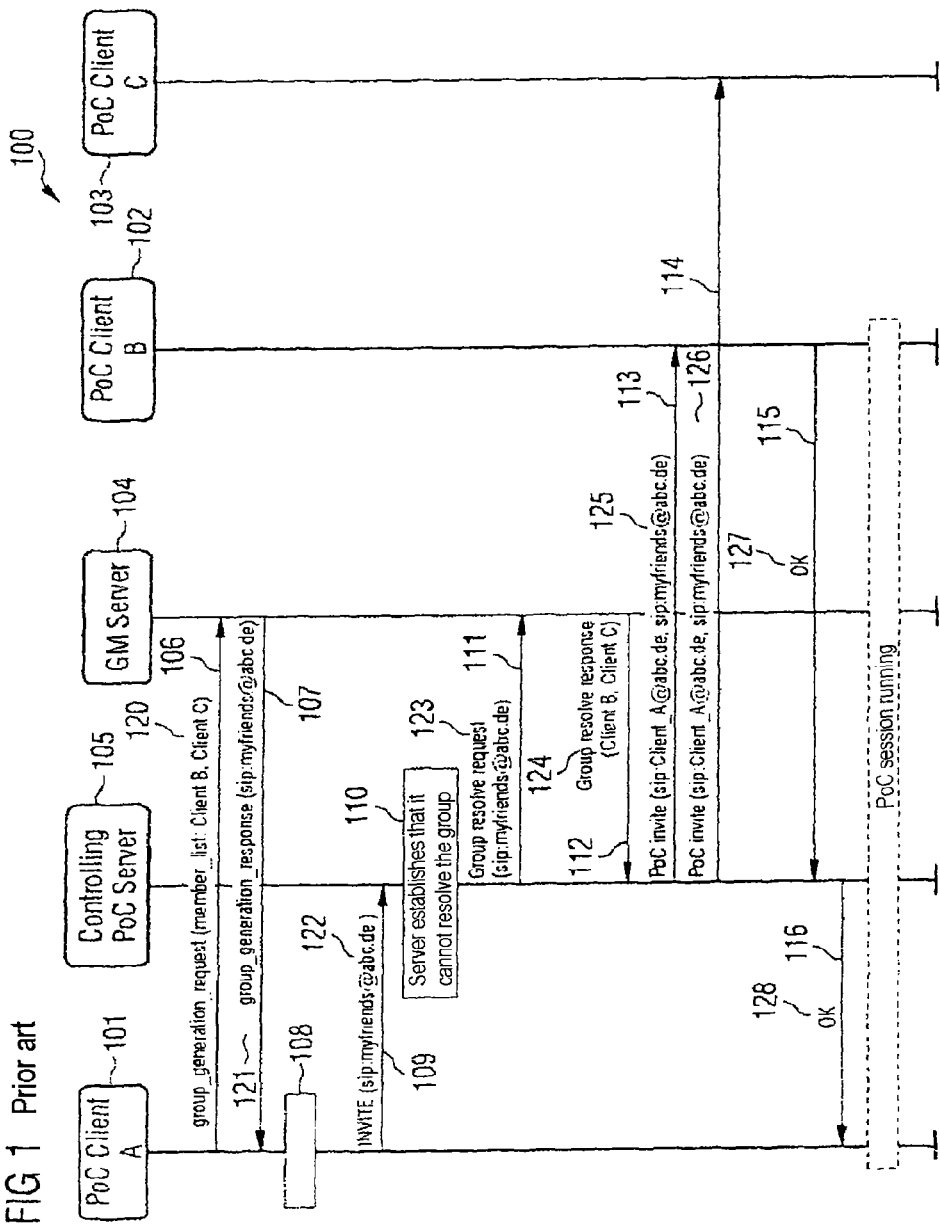
FIG. 1 shows a message flow diagram based on the prior art.

The invention is based on the problem of providing an opportunity to use groups within the context of communication services which does not have the aforementioned drawbacks arising.

The problem is solved by a communication system, a method for operating a communication system, a server unit, a method for operating a server unit, a communication service client unit and a method for operating a communication service client unit having the features based on the independent patent claims.

The invention provides a communication system having a communication service client unit, further communication service client units, a communication service server unit and a server unit, where the communication service client unit is set up to produce one or more messages which contain at least one criterion which is respectively met or not met by the further communication service client units and contain the request for provision of the communication service and a specification that the further communication service client units which meet the criterion can be participants in the communication service provided. The server unit is set up to produce a list of the further communication service client units which meet the criterion and to transmit it to the communication service server unit; and the communication service server unit is set up to provide the communication service using the communication service client unit and the further communication service client units which meet the criterion as participants.

The invention also provides a communication system having a communication service client unit, further communication service client units, a communication service server unit and a server unit, where the communication service client unit is set up to produce one or more messages which contain at least one criterion which is respectively met or not met by the further communication service client units and contain the request for provision of the communication service and a specification that the further communication service client units which meet the criterion can be participants in the communication service provided. The server unit is set up to transmit an information item representing the at least one criterion to the communication service server unit; and the communication service server unit is set up to provide the communication service using the communication service client unit and the further communication service client units which meet the criterion as participants.

The invention also provides methods for operating a communication system, server units, methods for operating a server unit, a communication service client unit and a method for operating a communication service client unit based on the communication systems described above.

Clearly, a user uses his communication service client unit to specify a criterion on the basis of which, when the user uses his communication service client unit to request a communication service, a group of further users (or further communication service client units) is created dynamically whose group members together with the user can participate in the communication service provided, for example PoC (Push to talk over Cellular) communication.

The user therefore does not statically stipulate a group for the server unit, for example a GM (Group Management) server, which he can modify only manually by sending messages to the server unit, for example by sending a message specifying that a particular user needs to be added to the group, but rather specifies a criterion according to which the server unit automatically ascertains the group dynamically (at the start of provision of the communication service).

By way of example, a user in a taxi control centre may specify as a criterion that all drivers of taxis which are currently free need to be part of a PoC group. The server unit dynamically creates the PoC group, for example by enquiring with the presence server which contains information for each taxi regarding whether the taxi is currently free. In this way, the user can always send voice messages precisely to the taxis which are currently free without always having to update the PoC group manually and without itself obtaining the information regarding what taxis are currently free, which would require considerable signalling complexity.

In this way, the invention raises user-friendliness and lowers signalling complexity to a significant degree.

In the example above, the further communication service client units are in the form of mobile radio participant terminals belonging to the taxi drivers, for example.

The invention allows the first communication service client unit and the further communication service client units to be in the form of mobile radio participant terminals based on the UMTS (Universal Mobile Telecommunication System) standard or on the GSM (Global System for Mobile Communication) standard, for example.

However, the invention can be applied not just when the communication service is provided by means of a mobile radio communication network, but also when the communication service is provided by means of a landline network, for example a PSTN (Public Switched Telephone Network). In both cases, the communication service can be provided by means of the Internet, for example the communication service is an Internet based conference communication service and the communication service client units are accordingly conference communication terminals. The invention is suitable for a large number of group-specific communication services.

Clearly, the further communication service client units which can participate in the communication service are not (only) specified by means of a list, but rather are clearly "outlined", for example filtered out of a list of potential participants on the basis of the criterion and thus dynamically stipulated using a prescribable criterion (or a plurality of prescribable criteria).

The invention therefore makes it possible to use groups defined dynamically, using criteria, within the context of communication services.

The exemplary embodiments described below also have the advantage that they are based on existing, in some cases already standardized, communication networks. To implement the exemplary embodiments, it is not necessary to add any new network elements over the existing communication networks; the existing network elements have their functionality extended. The exemplary embodiments can therefore be implemented easily and inexpensively.

In one embodiment, the user can specify a value which limits the maximum number of the further communication service client units which can participate in the communication service. Clearly, the user therefore has control over the size of the dynamically created group.

If the group of the further communication service client units which meet the criterion changes while the communication service is already being provided, that is to say during the communication service, then this can be allowed for and, by way of example, further communication service client units which did not meet the criterion at the time at which provision of the service started, but which now do meet it, can become participants, for example can be invited to join the communication service provided (for example a conference). Conversely, one of the further communication service client units which no longer meets the criterion can be excluded from the communication service provided, for example can be removed from a conference. To implement this, the server unit can periodically check the criteria.

The server unit and the communication service server unit can be provided by the same server computer.

In one embodiment, the communication service server unit responds to the second message by sending a message to the communication service client unit notifying the communication service client unit of which of the further communication service client units currently meet the criterion. The communication service client unit can then confirm whether or not the communication service can actually be provided using the further communication service client units which currently meet the criterion as participants.

Clearly, the invention extends the group management operations provided in line with the prior art. In addition, the requests which the communication service client unit sends to the communication service server unit are clearly extended, for example by the specification that the communication service can be provided using the group members of a dynamically defined group as participants.

The server unit may be in the form of a group management server unit and, by way of example, may be provided by a GM (Group Management) server computer extended over the prior art as appropriate, or by any other server computer.

Preferred developments of the invention can be found in the dependent claims. The further refinements of the invention which are described in conjunction with the communication system also apply mutatis mutandis to the methods for operating a communication system, to the server units, to the methods for operating a server unit, to the communication service client unit and to the method for operating a communication service client unit.

The information item representing the at least one criterion may be the at least one criterion itself.

In addition, the communication service client unit may be set up to send one or more messages with the at least one criterion to the server unit.

In line with one refinement of the invention, the server unit is set up to store the at least one criterion.

In addition, the server unit may be set up as a group management server unit.

By way of example, the request is held in a first message from the one or more messages and is transmitted from the communication service client unit to the communication service server unit.

In one embodiment, the criterion is held in a second message from the one or more messages and is transmitted from the communication service client unit to the server unit.

In one embodiment, the criterion is held in the first message from the one or more messages (and is forwarded from the communication service server unit to the server unit, for example).

In one embodiment, the server unit is set up to produce the list of the further communication service client units by transmitting to at least one information server unit a third message which contains the request for information which is required for checking whether the further communication service client units meet the criterion.

In another embodiment, the communication service server unit is set up to produce the list of the further communication service client units by transmitting to at least one information server unit a third message which contains the request for information which is required for checking whether the further communication service client units meet the criterion.

Clearly, the server unit or the communication service server unit asks an information server unit which has information relevant to the criterion for information which it checks in order to produce the list on the basis of the criterion.

By way of example, the information server unit is a presence server unit or a location server unit. Accordingly, the information relevant to the criterion is location information or presence information, for example.

If the server unit or the communication service server unit checks the criteria periodically (so as always to be able to check which of the further communication service client units currently meet the criterion) then it may subscribe with a location server or with a presence service, for example, so that it is always informed about status changes in the further communication service client units.

In one embodiment, the one or more messages also contains a further list of some of the further communication service client units, and one of the further communication service client units can be a participant in the communication service provided only if it is shown on the further list and meets the criterion.

The user of the communication service client unit can therefore define a list of potential group members from which the participants in the communication service are filtered on the basis of the criterion.

By way of example, the communication service is a communication service which is based on SIP (Session Initiation Protocol).

Using communication IDs (communication identifiers), different group combinations (or sub-group combinations) can be implemented within an SIP session, with dynamic groups (or sub-groups) being used. In particular, "whispering" and "sidebars" can be implemented, for example. By way of example, a user participating in group communication can send voice data to a dynamically defined sub-group and this voice data can be received only by the members of the sub-group.

In one embodiment, the at least one criterion is specified in the one or more messages on the basis of XML (eXtended Markup Language).

By way of example, the communication service is a PoC communication service, a communication service for sending instant messages, an MMS communication service or a conference communication service.

As mentioned above, the server unit checks, in the course of providing the communication service, the validity of the list of the further communication service client units which meet the criterion (for example periodically), updates this list if appropriate and transmits the updated list to the communication service server unit.

As mentioned above, the communication service server unit may be set up to alter the participants in the communication service on the basis of the updated list.

In line with another refinement of the invention, the communication service server unit checks, in the course of providing the communication service, whether the further communication service client units still meet the criterion (for example periodically) and, if appropriate, alters the participants in the communication service.

In one embodiment, the communication service is provided as part of a further communication service provided by the communication service server unit.

Clearly, dynamically created sub-groups of a group are used within the context of a communication service which is provided for the group. By way of example, PoC communication is set up within the context of a PoC session, with the participants in the PoC communication (or the client units which they use) meeting the criterion.

Figure 2:
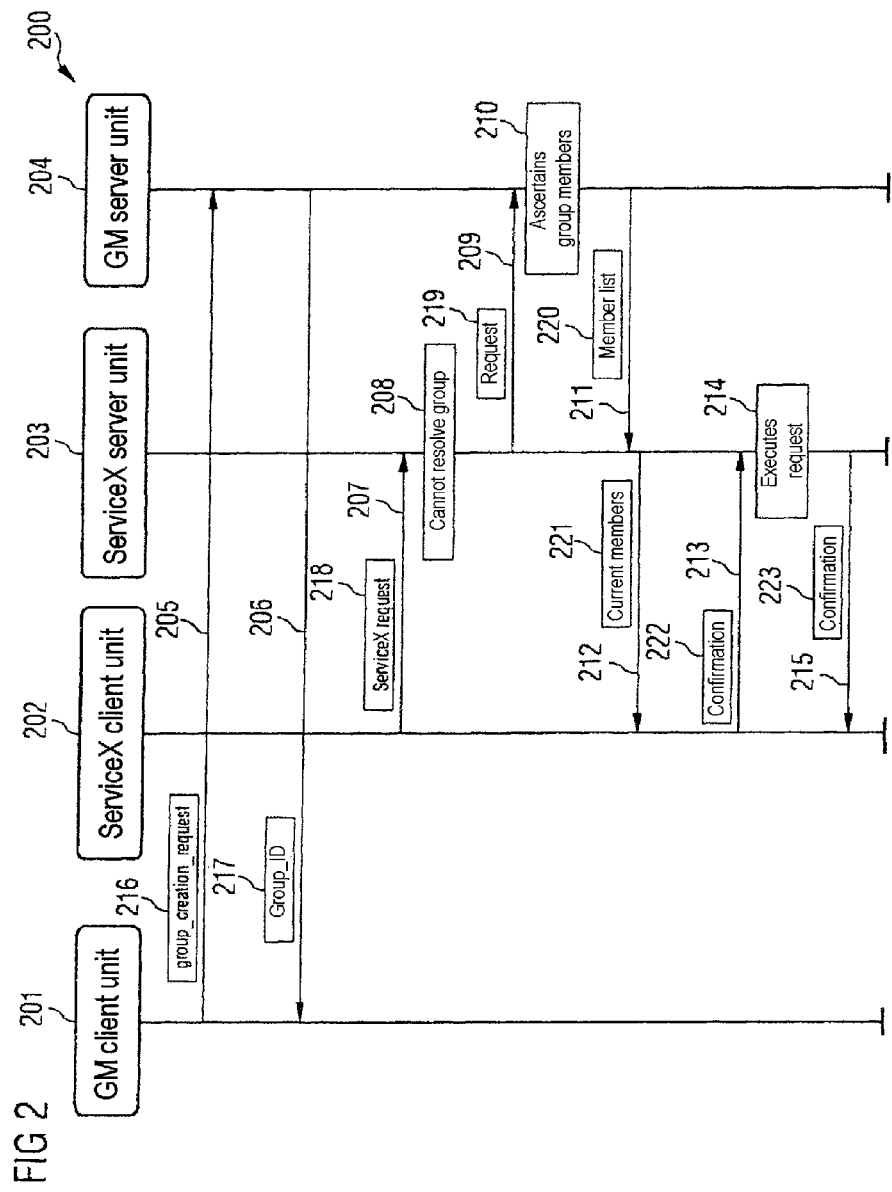
FIG. 2 shows a message flow diagram based on an exemplary embodiment of the invention.

FIG. 2 shows a message flow diagram 200 based on an exemplary embodiment of the invention.

The message flow 200 takes place between a GM (Group Management) client unit 201, a ServiceX client unit 202, a ServiceX server unit 203 and a GM (Group Management) server unit 204. In this case, ServiceX stands for any communication service within whose context groups can be used.

Accordingly, the ServiceX is a PoC (Push-to-Talk over Cellular) communication service, a communication service for sending instant messages, an MMS (Multimedia Message Service) communication service or a conference communication service, for example. The ServiceX client unit 202 and the ServiceX server unit 203 are arranged and configured in line with the communication service. An architecture for using PoC is explained further below.

In step 205, the GM client unit 201 creates a (PoC) group on the GM server unit 204. To this end, the GM client unit 201 sends a group-creation-request message 216 to the GM server unit 204. The group-creation-request message 216 contains:
  a list of potential group members of the group and/or a first list of criteria;
  (optionally) a specification of a maximum number of group members in the group;
  (optionally) a specification that the automatic update flag has been set;
  (optionally) other values of parameters specific to the ServiceX.

The GM server unit 204 then creates an appropriate group and, in step 206, sends a response message 217 to the GM client unit 201 which contains a unique identifier (ID) for the group created.

In step 207, the ServiceX client unit 202 sends a request message 218 with the request for provision of the ServiceX to the ServiceX server unit 203. The request message 218 contains:
  the identifier for the group and/or a second list of criteria;
  (optionally) a further list of potential group members; if the group-creation-request message 216 has already indicated a list of potential group members then the further list of potential group members may be an extension of the list of potential group members;
  (optionally) the specification of a maximum number of group members in the group;
  (optionally) the specification that the automatic update flag has been set;
  (optionally) a request identifier (request ID) for the requested communication service; if the ServiceX is a PoC communication service then this is a PoC communication ID called id_proposal;
  (optionally) values of other parameters specific to the ServiceX.

In step 208, the ServiceX server unit 203 establishes that it cannot resolve the group, i.e. that it cannot determine the current group members. It therefore sends a request message 219 to the GM server unit 204 with the request that the GM server unit 204 resolve the group. The request message 219 contains:
  the identifier for the group;
  (optionally) the second list of criteria;
  (optionally) the list of potential group members (subsequently this is always understood to mean the list of potential group members, possibly extended by the further list of potential group members, or possibly the further list of potential group members itself if the group-creation-request message 216 has not indicated a list of potential group members);
  (optionally) the specification of a maximum number of group members in the group;
  (optionally) values of other parameters specific to the ServiceX.

If the automatic update flag has been set then the ServiceX server unit 203 uses the request message 219 to ask the GM server unit 204 for a longer-term group composite change notification. In this case, the ServiceX server unit 203 is informed by the GM server unit 204 whenever the composition of the group changes, for example when a potential group member no longer meets or in the mean time does not meet the criteria indicated by means of the first list of criteria or by means of the second list of criteria. In particular, when the automatic update flag has been set, the GM server unit 204 periodically checks which potential group members currently meet the criteria.

This subscription, i.e. the request for the group composite change notification, may alternatively be performed by the ServiceX server unit 203 at a later time too.

In step 210, the GM server unit 204 ascertains all users who (if available) are indicated in the list of potential group members who meet the criteria on the first list of criteria (if available) and who meet the criteria on the second list of criteria (if available). These users form the current list of group members. The manner in which the GM server unit 204 ascertains the current group members (i.e. the members on the current list of group members) is dependent on the criteria specified by means of the first list of criteria or by means of the second list of criteria. This is explained further below.

In step 211, the GM server unit 204 sends a further response message 220, which contains the current list of group members, to the ServiceX server unit 203.

Steps 212 and 213 are carried out optionally. In step 212, the ServiceX server unit 203 transmits an information message 221 to the ServiceX client unit 202, which it uses to inform the ServiceX client unit 202 about the current list of group members. By way of example, the information message 221 may also contain the number of current group members or else the full current list of group members.

In step 213, the ServiceX client unit 202 sends a confirmation message 222 to the ServiceX server unit 203, which it uses to confirm the request for the ServiceX which was made in step 207. Alternatively, the ServiceX client unit 202 may withdraw the request for the ServiceX in step 213, and the sequence is accordingly ended.

In step 214, the request for the ServiceX which was made in step 207 is dealt with, if it has not been withdrawn in step 213, by the ServiceX server unit 203 using the current list of group members. Depending on what type of communication service the ServiceX is, this is done by virtue of the ServiceX server unit 203 performing appropriate actions, for example inviting the group members to join a group communication.

In step 215, the ServiceX server unit 203 confirms the request for the ServiceX which was made in step 207 by sending a request confirmation message 223 to the ServiceX client unit 202. The request confirmation message 223 contains:

(optionally) the current list of group members;
a response identifier (response ID); if the ServiceX is a PoC communication service then this a PoC communication ID called PK_id;
(optionally) values of other parameters specific to the ServiceX.

If the ServiceX server unit 203 has asked the GM server unit 204 for a group composite change notification then in the event of a change to the current list of group members the ServiceX server unit 203 is notified about the changed current list of group members. The ServiceX server unit 203 is thus always aware of the present composition of the current list of group members. Depending on what type of communication service the ServiceX is, the change to the current list of group members (and the corresponding notification of the ServiceX server unit 203) has particular associated actions, for example inviting a group member who has just been added to the current list of group members to join a group communication.

In another embodiment, steps 205 to 211 are carried out as described above. However, step 212 is carried out necessarily and the information message 221 contains the current list of group members and also a temporary group identifier. In step 213, the ServiceX client unit 302 does not send a confirmation message 222 to the ServiceX server unit 203, but rather a fresh request for the ServiceX to the ServiceX server unit 303, indicating the temporary group identifier. The rest of the sequence is similar to above from step 214 onward.

In one embodiment, the GM server unit 204 is not in the form of a separate functional unit, but rather the functionality described above for the GM server unit 204 is undertaken by the ServiceX server unit 203. In particular, there is no longer the interaction between the GM server unit 204 and the ServiceX server unit 203 in steps 219 and 220 or the notifications to the ServiceX server unit 203 as part of a group composite change notification.

Figure 3:
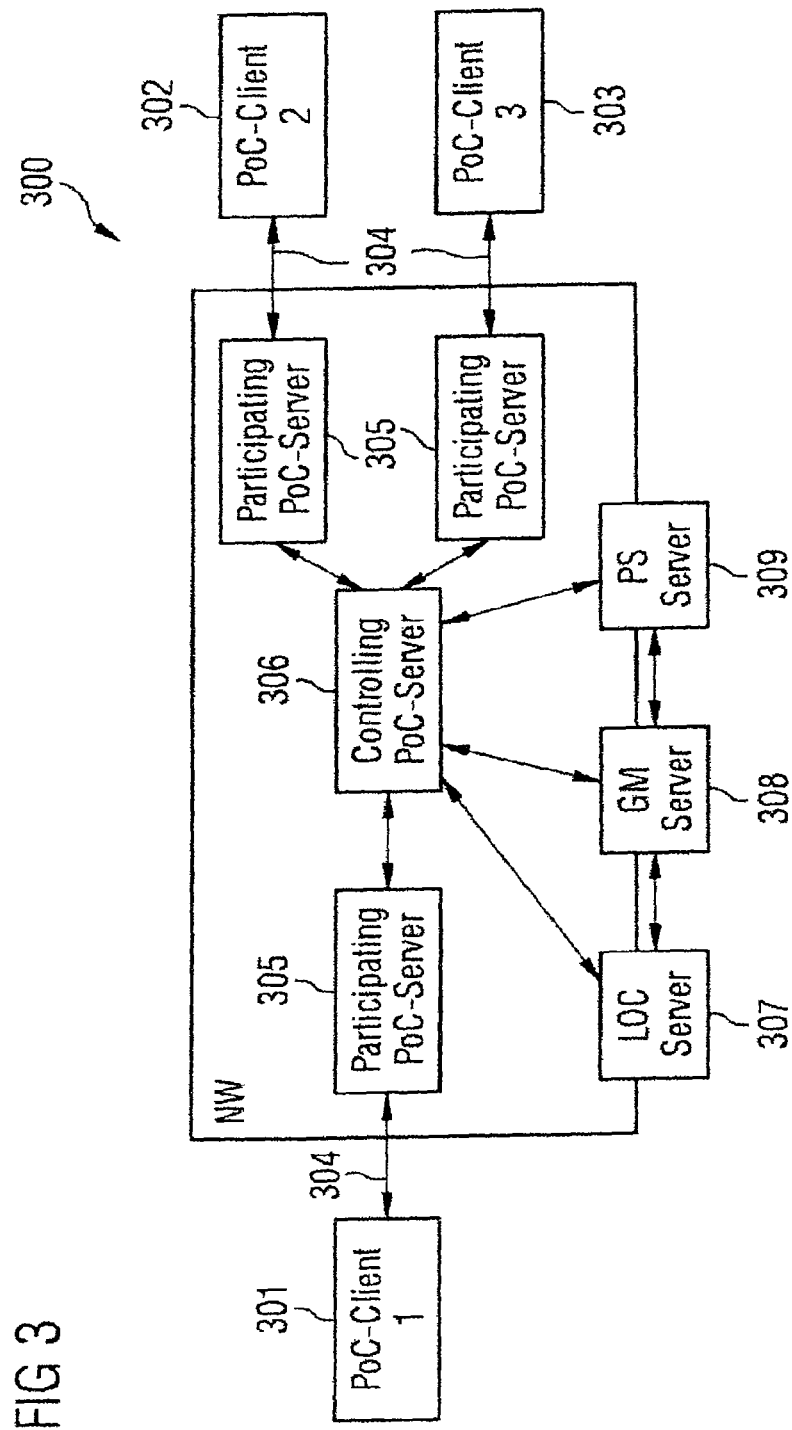
FIG. 3 shows a communication system based on an exemplary embodiment of the invention.

FIG. 3 shows a communication system 300 based on an exemplary embodiment of the invention.

A first PoC client unit 301, a second PoC client unit 302 and a third PoC client unit 303 are coupled to a respective PoC participant server computer (PoC server computer Participant Function) 305 by means of a respective interface 304. The PoC participant server computers 305 are coupled to a PoC control server computer (PoC server computer controlling function) 306.

The PoC control server computer 306 is coupled to a location server computer 307, to a GM (Group Management) server computer 308 and to a presence server computer 309. The GM server computer 308 is likewise coupled to the location server computer 307 and to the presence server computer 309.

The location server computer 307 provides location information. By way of example, the GM server computer 308 can ask the location server computer 307 for the location of the second PoC client unit 302.

The presence server computer 309 provides presence information. By way of example, the GM server computer 308 can ask the presence server computer 309 whether the second PoC client unit 302 is currently available and is not switched off, for example, or a communication link cannot be set up to it for another reason.

The interfaces 304 are provided, by way of example, by means of the RAN (Radio Access Network), the core network (CN) and the IMS (Internet Protocol based Multimedia Subsystem) of a UMTS (Universal Mobile Telecommunication System) communication system or of a GSM (Global System for Mobile Communication) communication system.

Alternatively, the interfaces 304 can be provided by means of a PSTN (Public Switched Telephone Network) communication network, for example.

The PoC client units 301, 302, 303 are respectively integrated in a mobile radio communication terminal which is set up in line with the respective interface 304 to communicate on the basis of the UMTS standard, the GSM standard, the GPRS (General Packet Radio Service) standard or another mobile radio communication standard, for example.

FIG. 4 shows a message flow diagram 400 based on an exemplary embodiment of the invention.

The message flow shown takes place between a PoC client unit 401, a PoC control server computer 402, a GM server computer 403, a location server computer 404, a presence server computer 405 and further PoC client units 406, which are arranged and configured as explained with reference to FIG. 3, the second PoC client unit 302 and the third PoC client unit 303 corresponding to the further PoC client unit 406.

In the exemplary embodiment explained below, it is assumed that the user of the PoC client unit 401 wishes to start a PoC session with all of his friends,
who are currently in the same town as him (in this example this is a first criterion; criteria_1)
and who are currently not working (in this example this is a second criterion; criteria_2).

To do this, the user of the PoC client unit 401 creates a PoC group in the GM server computer 403 by sending a group_generation_request message 423 in step 407. To define the PoC group, the user transmits a listing (member_list) contained in the group_generation_request message 423, of twenty different users (the user's friends—these are the potential group members) and a first criterion (criteria_1), specified in the group_generation_request message 423, that the friends need to be in the town of Hamburg at the time at which the PoC group is being used.

The group_generation_request message can be sent using an HTTP get instruction, for example, which is in the form shown in Table 1.

TABLE 1

GET http://glms.abc.de/script?action=create_group http/1.1
<?xml version="1.0"?>
<dynamic_group name="My friends in Hamburg">
    <member uri="sip:freund_01@web.de"/>
    <member uri="sip:freund_02@web.de"/>
    ...
    <member uri="sip:freund_20@web.de"/>
    <criteria>
        <location_criteria>
            <in_city name="Hamburg" satisfy="yes"/>

TABLE 1-continued

```
        </location_criteria>
    </criteria>
</dynamic_group>
```

HTTP get instructions are described in RFC "Hypertext Transfer Protocol—HTTP/1.1" RFC "Hypertext Transfer Protocol—HTTP/1.1" (group management operations using HTTP are described in Push to Talk over Cellular (PoC); List Management and Do-not-Disturb; PoC Release 2.0).

In Table 1 and in the further tables, the entries provided additionally over the conventional messages, in line with the exemplary embodiments, are shown in bold.

In step 408, the GM server computer 403 responds by sending a group_generation_response message 424 which contains a unique group identifier for the PoC group, in this case the identifier sip:myfriends@abc.de, to the PoC client unit 401.

In step 409, the user of the PoC client unit 401 selects the PoC group and stipulates the second criterion (criteria_2) (the first criterion and the second criterion may each also comprise a plurality of criteria) in order to use the PoC client unit 401 to start a PoC session with the potential group members in the PoC group who meet the first criterion and the second criterion. The first criterion and the second criterion describe the PoC group dynamically, since over time there may be a change in whether the potential group members, i.e. the users who are shown in the list of users contained in the group_generation_request message 423, meet the first criterion and the second criterion.

The user of the PoC client unit 401 wishes the present composition of the PoC group to be taken into account during the PoC session which is to be started. The PoC group is at any time currently made up of the potential group members who meet the first criterion and the second criterion. In particular, in the course of the PoC session, potential group members who are currently not participating in the PoC session need to be invited to the PoC session if they meet the first criterion and the second criterion (in contrast to before). To achieve this, the user of the PoC client unit 401 sets the automatic update flag (automatic_update_flag).

In step 410, the user starts the PoC session by sending an INVITE message 425 to the PoC control server computer 402. The INVITE message 425 is configured in line with an SIP INVITE. SIP INVITE is described in RF3261 "SIP: Session Initiation Protocol". The INVITE message 425 contains a specification of the second criterion (criteria_2) and also the specification that the automatic update flag has been set. This is done using a content type which has a new definition over the prior art, for example. The INVITE message 425 is in the form shown in Table 2, for example.

TABLE 2

```
INVITE sip:myfriends@abc.de SIP/2.0
...
Content-Type: application/criteria+xml
Content-Length: (...)
<?xml version="1.0"?>
<criteria>
    <presence_criteria>
        <on_work satisfy="no"/>
    </presence_criteria>
    <automatic_update value="yes"/>
</criteria
```

In step 411, the PoC control server computer 402, having received the INVITE message 425, establishes that it cannot resolve the PoC group, i.e. that it cannot determine those group members from which the PoC group is currently made up.

Accordingly, the PoC control server computer 402 transmits a first SUBSCRIBE message 426 in step 412 in order to ask the GM server computer 403 to ascertain the present (current) group members, i.e. the group members from which the PoC group is currently made up. To allow the GM server computer 403 to ascertain the current group members, the first SUBSCRIBE message 426 contains the second criterion. In this exemplary embodiment, the first SUBSCRIBE message 426 is configured in line with an SIP SUBSCRIBE, for example as shown in Table 3 (SIP SUBSCRIBE is described in RFC3265 "Session Initiation Protocol (SIP)-Specific Event Notification").

TABLE 3

```
SUBSCRIBE sip:myfriends@abc.de SIP/2.0
...
Event: dynamic_group
Accept: application/dynamic_group_info+xml
Content-Type: application/criteria+xml
Content-Length: (...)
<?xml version="1.0"?>
<criteria>
    <presence_criteria>
        <on_work satisfy="no"/>
    </presence_criteria>
</criteria>
```

As mentioned, the second criterion is that the group members must not currently be working.

Since the GM server computer 403 requires the current location (location status) of the potential group members (or of the PoC client units used by the potential group members) in order to ascertain the current group members, the GM server computer 403 sends a second SUBSCRIBE message 427 (based on SIP SUBSCRIBE) to the location server computer 404 in step 413 in order to subscribe with the location server computer 404 and to obtain information about the respective location status of the potential group members.

In addition, the GM server computer 403 requires the information regarding whether the potential group members are currently working in order to ascertain the current group members. This information will be held for each potential group member in a presence information item (presence status) managed for this group member by the presence server computer 405. Accordingly, the GM server computer 403 sends a third SUBSCRIBE message 428 to the presence server computer 405 in step 414. The second SUBSCRIBE message 427 and the third SUBSCRIBE message 428 are transmitted for each potential group member. This is shown by way of example in FIG. 4 for the first group member with the identifier sip:freund_01@web.de, which is held in the first SUBSCRIBE message 427 and in the second SUBSCRIBE message 428.

As mentioned, the first criterion is that the friends, i.e. the potential group members, need to be in the town of Hamburg. Alternatively, the first criterion may also be a location criterion which is dependent on the location of the user (or of the PoC client unit 401). By way of example, the first criterion might be that only potential group members who (or whose PoC client units) are in a 5-km radius of the position of the user or of the PoC client unit 401 belong to the group. In this case, the GM server computer 403 also needs the location information for the user of the PoC client unit 401 in order to ascertain the current group members, and accordingly sends the first SUBSCRIBE message 427 to the location server computer 404 not just respectively for all potential group members, but also for the user of the PoC client user 401. Subsequently, however, it is assumed that the first criterion is that the group members need to be in the town of Hamburg.

The first SUBSCRIBE message 427, which, as mentioned, is respectively transmitted to the location server computer 404 for each potential group member, is answered by the location server computer 404 in step 415 using a respective first NOTIFY message 429 containing the location status of the respective group member.

Similarly, in step 416, the second SUBSCRIBE message 428, which may be sent to the presence server computer 405 for each group member, is respectively answered by the presence server computer 405 by transmitting a second NOTIFY message 430 to the GM server computer 403. The second NOTIFY message 430 contains the information for the respective potential group member regarding whether the respective potential group member is currently working.

Using the information transmitted to it in step 415 and step 416, the GM server computer ascertains the current group members in step 417 by checking, for each potential group member, whether the potential group member meets the first criterion and the second criterion. In step 418, the GM server computer 403 uses a third NOTIFY message 431 to transmit the list of the current group members (current_member_list) to the PoC control server computer 402. In this example, the third NOTIFY message 431 is in a form based on an SIP NOTIFY and as shown in Table 4.

TABLE 4

NOTIFY sip:gm-server@abc.de SIP/2.0
...
Event: dynamic_group
Content-Type: application/dynamic_group_info+xml
Content-Length: (...)
<?xml version="1.0"?>
<dynamic_group_info>
    <member uri="sip:freund_05@web.de"/>
    <member uri="sip:freund_09@web.de"/>
    <member uri="sip:freund_14@web.de"/>
</dynamic_group_info>

Following receipt of the third NOTIFY message 431, the PoC control server computer 402 has information about which users are current group members. Optionally, steps 419 and 420 are now also carried out. In step 419, the PoC control server computer sends the list of the current group members (current_group_list)—in another embodiment just the indication of the number of the current group members—to the PoC client unit 401 using a MESSAGE message 432. The MESSAGE message 432 is in the form SIP MESSAGE. SIP MESSAGE is described in RFC3428 "Session Initiation Protocol (SIP) Extension for Instant Messaging".

In step 420, the PoC client unit 401 responds using a second MESSAGE message 433, which is likewise in a form based on SIP MESSAGE and, in this example, specifies that the PoC session with the current group members actually needs to be started.

In step 421, the PoC control server computer 402 sends a second INVITE message 434 to all current group members, in this example to all further PoC client units 406. The second INVITE message 434 is in the form of SIP INVITE. Step 421 is clearly an invitation to all further PoC client units 406 to join the PoC session which is to be set up. This is done in conventional fashion. In response, the further PoC client units 406 each send a first 200 OK message 435 (based on SIP 200 OK) to the PoC control server computer 401.

By sending the first 200 OK message 435, one of the further PoC client units 406 (or the relevant user) accepts the invitation to join the PoC session which is to be set up. When the PoC control server computer 402 has received the first 200 OK message 435 (i.e. as soon as one of the current group members has accepted the invitation to join the PoC session), the PoC control server computer sends a second 200 OK message 436 to the PoC client unit 401, which signals that one of the current group members has accepted the invitation to join the PoC session.

The PoC session now proceeds with all the friends of the user of the PoC client unit 401 who meet the first criterion and the second criterion (and have accepted the invitation to join the PoC session).

FIG. 5 shows a message flow diagram 500 based on an exemplary embodiment of the invention.

In similar fashion to the exemplary embodiment described with reference to FIG. 4, the message flow shown takes place between a PoC client unit 501, a PoC control server computer 502, a GM server computer 503, a location server computer 504, a presence server computer 505 and further PoC client units 506.

In this exemplary embodiment, it is assumed that the user of the PoC client unit 501 wishes to start a PoC session with all users of PoC who are currently at the same university as him and who are currently not working. The expression "current group members" etc. is used below in similar fashion to in the exemplary embodiment explained with reference to FIG. 4.

In step 507, the PoC client unit 501 transmits a group_generation_request message 524 to the GM server computer 503 in order to request that a PoC group be created. The group_generation_request message 524 contains the specification of a first criterion (criteria_1) stating that the group members need to be at the same university as the user of the PoC client unit 501 at the time of the PoC session, i.e. at the time at which the PoC group is used within the context of a PoC session. The group_generation_request message 524 also contains a specification of a second criterion (criteria_2) stating that the current group members (of the PoC group) must not be working. By way of example, the group_generation_request message 524 is in the form shown in Table 5, and the user transmits the group_generation_request message 524 in order to create the PoC group which is dynamically defined by the first criterion and the second criterion.

TABLE 5

GET http://glms.abc.de/script?action=create_group HTTP/1.1
<?xml version="1.0"?>
<dynamic_group name="People with free time in Hamburg">
    <criteria>
        <location_criteria>
            <in_university name="TU Hamburg" satisfy="yes"/>
        </location_criteria>
        <presence_criteria>
            <on_work satisfy="no"/>
        <presence_criteria>
    </criteria>
</dynamic_group>

It is now necessary for the GM server computer 503 to ascertain all PoC users who meet the first criterion and the second criterion.

In one embodiment, which is not shown in FIG. 5, the GM server computer 530 proceeds as follows. In contrast to the embodiment explained with reference to FIG. 4, no list of potential group members has been transmitted to the GM server computer 503 by the PoC client unit 501. Therefore, the GM server computer 503 ascertains a list of potential group members, clearly a general member list as a basis. To this end, the GM server computer asks one or more network units for a list of known or suitable PoC client units. These network units are, by way of example, an HLR (Home Location Register (from the same operator as also provides the communication network for communication between the PoC client unit 501 and the GM server computer 503)), a "meta" HLR, i.e. an HLR which has stored the information from HLRs from various operators, or various HLRs from various operators.

The list of potential group members which has been requested in this way is clearly used as a basis by the GM server computer 503, which, in similar fashion to in steps 413 and 414 explained with reference to FIG. 4, sends SUBSCRIBE messages for each potential group member to the location server computer 504 or to the presence server computer 505 and in this way ascertains the location information and presence information for the potential group members which is required in order to determine the current list of group members. Next, the GM server computer 503 ascertains the current list of group members (current_member_list). Since the list of potential group members which the GM server computer 503 ascertains in this embodiment may typically be very large, a very high level of signalling complexity is required in order to create the list of potential group members, in particular. The embodiment below is therefore preferred, which is also illustrated in FIG. 5.

In step 508, the GM server computer 503 sends a first SUBSCRIBE message 525 to the location server computer 504. The first SUBSCRIBE message 525 is sent not only to the location server computer 504 but also to all suitable location servers, i.e. to location servers which manage location information from PoC client units.

By way of example, the rest of the sequence is explained using the location server computer 504. The first SUBSCRIBE message 525 transmitted in step 508 has a specification for the first criterion (which is clearly location specific). The first SUBSCRIBE message 525 is in the form shown in Table 6, for example.

TABLE 6

SUBSCRIBE sip:loc-server@abc.de SIP/2.0
...
Event: matched_users
Accept: application/matched_user_info+xml
Content-Type: application/criteria+xml
Content-Length: (...)
<?xml version="1.0"?>
<criteria>
    <location_criteria>
        <in_university name="TU Hamburg" satisfy="yes"/>
    </location_criteria>
</criteria>

In step 509, the location server 504 responds to the SUBSCRIBE from the GM server 503, i.e. the first SUBSCRIBE message 525, by transmitting a first NOTIFY message 526 to the GM server computer 503. In this way, the location server computer 504 signals to the GM server computer 503 a list of (PoC) users (or a list of the PoC client units used by the users) who meet the first criterion (matched_users_list_1). The first NOTIFY message 526 is in the form shown in Table 7, for example.

TABLE 7

NOTIFY sip:gm-server@abc.de SIP/2.0
...
Event: matched_users
Content-Type: application/matched_user_info+xml
Content-Length: (...)
<?xml version="1.0"?>
<matched_user_info>
    <matched_user uri="sip:hans@web.de"/>
    <matched_user uri="sip:peter@web.de"/>
    <matched_user uri="sip:lustig@web.de"/>
</matched_user_info>

Steps 510 and 511 are carried out in similar fashion to steps 508 and 509. That is to say that the GM server computer 503 transmits a second SUBSCRIBE message 527 with a specification of the second criterion to the presence server computer 505 in step 510 (by way of example, in similar fashion to above, a respective second SUBSCRIBE message is transmitted to all suitable presence server computers). In step 511, the presence server computer 505 responds by transmitting a second NOTIFY message 528 to the GM server computer 503, concerning a list of the (PoC) users (or a list of the PoC client units used by the users) who meet the second criterion (matched_users_list_2).

In step 512, the GM server computer 503 ascertains the current list of group members (current_member_list) by forming the cut-set from the list of users (or of the PoC client units used by the users) who meet the first criterion and the list of users (or of the PoC client units used by the users) who meet the second criterion.

In another embodiment, the second SUBSCRIBE message 527 is sent only to presence server computers which manage presence information about users (or the PoC client units used by the users) which are listed in the NOTIFY message 526. Clearly, the GM server computer 503 enquires only for the users who meet the first criterion. Accordingly, the GM server computer 503 obtains presence information in step 511 only for the users who meet the first criterion. Using this presence information and the information obtained in step 509, the GM server computer 503 ascertains the current list of the group members in step 512.

The rest of the process is independent of how the current list of the group members has been ascertained, particularly the process below is also performed when, as described above, the GM server computer 503 first of all ascertains a list of potential group members by requesting appropriate information for one or more HLRs, for example.

In step 513, the GM server computer 503 responds to the request made by the PoC client unit 501 in step 507 by transmitting a group_generation_response message 529 to the PoC client unit 501. The group_generation_response message 529 contains a unique group identifier for the PoC group created, in this case sip:myfriends@abc.de, and the current list of the group members (or alternatively only the number of users which is part of the current list of group members).

At a later time, in step 514, the user of the PoC client unit 501 selects the PoC group in order to start a PoC session with the current group members of the PoC group using the first PoC client unit 501. In addition, the current composition of the PoC group also needs to be taken into account during the PoC session, i.e. the current group members (even if they change in the course of the PoC session) must always be part of the PoC session (if they accept an invitation).

By way of example, in the course of the PoC session, group members need to be invited as soon as they meet the first criterion and the second criterion. To achieve this, the user sets the automatic update flag (automatic_update_flag).

In step 515, the user uses the first PoC client unit 501 to send a first INVITE message 530 to start the PoC session. In this example, the first INVITE message 530 is in a form based on an SIP INVITE which is addressed to the unique group identifier. The first INVITE message 530 contains a specification that the automatic update flag has been set, for example by virtue of this specification being contained in the first INVITE message 530 as an SIP header. Accordingly, the first INVITE message 530 is in the form shown in Table 8.

TABLE 8

INVITE sip:myfriends@abc.de SIP/2.0
...
Update-frequency: numerical value
...

In step 516, the PoC control server computer 502, having received the first INVITE message 530, establishes that it cannot resolve the PoC group specified by means of the group identifier. In step 531, it therefore uses a third SUBSCRIBE message 531 to ask the GM server computer 503 to ascertain the current group members. The third SUBSCRIBE message 531 is in a form based on an SIP SUBSCRIBE and as shown in Table 9.

TABLE 9

SUBSCRIBE sip:myfriends@abc.de SIP/2.0
...
Event: dynamic_group
Accept: application/dynamic_group_info+xml
Content-Length: 0

In step 518, the GM server computer 503 responds to the third SUBSCRIBE message 531 by transmitting the list of the current group members to the PoC control server computer 502 using a third NOTIFY message 518. The third NOTIFY message 518 is in a form shown in Table 10.

TABLE 10

NOTIFY sip:poc-server@abc.de SIP/2.0
...
Event: dynamic_group
Content-Type: application/dynamic_group_info+xml
Content-Length: (...)
<?xml version="1.0"?>
<dynamic_group_info>
   <member uri="sip:freund_05@web.de"/>
   <member uri="sip:freund_09@web.de"/>
   <member uri="sip:freund_14@web.de"/>
</dynamic_group_info>

Following receipt of the third NOTIFY message 532, the PoC control server computer 502 has information about which users are current group members. Optionally, steps 519 and 520 are now also performed. In step 519, the PoC control server computer 502 sends the list of the current group members (current_member_list)—in another embodiment just the indication of the number of the current group members—to the PoC client unit 501 using an UPDATE message 533. The UPDATE message 533 is in the form of SIP UPDATE (or alternatively in the form of SIP INFO).

In step 520, the PoC client unit 501 responds using a second UPDATE message 534, which is likewise in a form based on SIP UPDATE and, in this example, specifies that the PoC session with the current group members actually needs to be started. The PoC client unit 501 can end the sequence at this time by transmitting a CANCEL message (based on SIP CANCEL, see RF3261 "SIP: Session Initiation Protocol") to the PoC control server computer 502 instead of the second UPDATE message 534.

In step 521, the PoC control server computer 502 sends a second INVITE message 535 to all current group members, in this example to all further PoC client units 506. The second INVITE message 535 is in the form of SIP INVITE. Step 521 is clearly an invitation to all further PoC client units 506 to join the PoC session which is to be set up. This is done in conventional fashion. In response, the further PoC client units 506 each send a first 200 OK message 536 (based on SIP 200 OK) to the PoC control server computer 401.

By sending the first 200 OK message 536, one of the further PoC client units 506 (or the relevant user) accepts the invitation to join the PoC session which is to be set up. When the PoC control server computer 502 has received the first 200 OK message 536 (i.e. as soon as one of the current group members has accepted the invitation to join the PoC session), the PoC control server computer sends a second 200 OK message 537 to the PoC client unit 401, signalling that one of the current group members has accepted the invitation to join the PoC session.

The PoC session now runs with all PoC users who meet the first criterion and the second criterion (and who have accepted the invitation to join the PoC session).

When the message flows illustrated in FIG. 4 and FIG. 5 have taken place, there is, as explained, a PoC session set up between the first PoC client unit 401, 501 and the PoC client units from which the current list of group members is made up. The text below refers to FIG. 6 and FIG. 7 to explain the procedure in accordance with one exemplary embodiment of the invention when the composition of the current list of group members changes.

FIG. 6 shows a message flow diagram 600 based on an exemplary embodiment of the invention.

In line with FIG. 4 and FIG. 5, the message flow shown takes place between a PoC client unit 601, a PoC control server computer 602, a GM server computer 603, a location server computer 604 and further PoC client units 605, which correspond to the relevant network elements shown in FIG. 4 and FIG. 5. In addition, a newly joining PoC client unit 606 is involved in the message flow shown.

As mentioned, it is assumed that a PoC session with the current group members as participants is set up, and it is also assumed that the automatic update flag has been set and that the PoC control server computer 602 has been informed of this, for example using the first INVITE message 530, which was transmitted in step 515.

It is assumed that the newly joining PoC client unit 606 (or the user of the newly joining PoC client unit) has not participated in the PoC session to date. By way of example, the current list of group members is ascertained on the basis of the criterion that the current group members (together with their PoC client units) need to be in Hamburg, but the user of the newly joined PoC client unit 606—this is the user labelled Friend_17—has not been in Hamburg up to now but is now returning to Hamburg during the PoC session which has already been set up.

It is also assumed that the GM server computer 603 has asked the location server 604 to obtain location information about the user Friend_17, for example an appropriate second SUBSCRIBE message 427 has been transmitted to the location server 404 for the user Friend_17 in step 413, since the user Friend_17 appears on the list of potential group members. Any other criteria used to ascertain the current list of group members, for example a criterion regarding the availability of the group members, as above, are met by the user Friend_17, for example he has set an appropriate presence status.

In step 607, the GM server computer 603 is informed, in line with his request, by means of a first NOTIFY message 614 of the fact that the user Friend_17 with the newly joining PoC client unit 606 is back in Hamburg, i.e. the GM server computer 603 is informed by the location status of the user Friend_17 (location_status_17).

When the first NOTIFY message 314 has been obtained, the GM server computer 603 ascertains the current list of group members again in step 608, clearly performs filtering again according to the criteria, and now establishes that the user Friend_17 meets all the prescribed criteria.

As described above, the PoC control server computer 602 has also sent a SUBSCRIBE message to the GM server computer 603 (for example the first SUBSCRIBE message 426 in step 412) and has therefore requested that it be informed about the current composition of the PoC group.

Accordingly, the GM server computer 603 sends a second NOTIFY message 615 to the PoC control server computer 602 in step 609, informing the PoC control server computer 602 that a new current group member (new_member_17) has joined.

The subsequent steps 610 and 611 are performed optionally.

In step 610, the PoC control server computer 602 sends a first MESSAGE message 616 (based on SIP MESSAGE) to the PoC client unit 601 and thus informs the PoC client unit 601 about the newly joined current group member.

In response, the PoC client unit 601 sends a second MESSAGE message 617 in step 611, which the PoC client unit 601 uses to confirm that the user Friend_17 needs to be incorporated, i.e. invited, into the PoC session in progress. In step 612, the PoC control server computer 602 invites the newly joining PoC client unit 606 to join the PoC session. This is done by transmitting an INVITE message 618. The newly joining PoC client unit 606 responds to the INVITE message 618 in step 613 using a 200 OK message 619. Steps 612 and 613 are performed in conventional fashion on the basis of an SIP INVITE and an SIP 200 OK. The user Friend_17 is then also participating in the PoC session.

FIG. 7 shows a message flow diagram 700 based on an exemplary embodiment of the invention.

The message flow shown takes place, as in FIG. 6, between a PoC client unit 701, a PoC control server computer 702, a GM server computer 703, a location server computer 704 and further PoC client units 705. The assumptions as at the start of the sequence explained with reference to FIG. 6 apply, but this time a new user (or new PoC client unit) does not join the PoC session in the course of the PoC session, but rather a departing PoC client unit 706, used by the user labelled Friend_05, leaves the PoC session.

It is first of all assumed that the user Friend_05 is participating in the existing PoC session using the departing PoC client unit 706. In particular, the user Friend_05 has to date met the criteria which are used to determine the current group members. It is now assumed that Friend_05 infringes one of the criteria. By way of example, one criterion is that the current group members need to be in the town of Hamburg, and the user Friend_05 is leaving the town of Hamburg with the departing PoC client unit 706.

In similar fashion to step 607, the location server computer 704 then sends a NOTIFY message 714 in step 707 to the GM server computer 703, informing the GM server computer about the new location status of the user Friend_05.

In similar fashion to step 608, the GM server computer 703 ascertains the current composition of the PoC group again in step 708. In this case, the GM server computer 703 establishes that the user Friend_05 does not meet the criteria which the current group members need to meet.

Accordingly and in similar fashion to step 609, it uses a second NOTIFY message 715 in step 709 to inform the PoC control server computer 702 that the user Friend_05 is no longer a current group member.

Steps 710 and 711 are performed optionally. In step 710, the PoC control server computer 702 sends a first MESSAGE message 716 (based on SIP MESSAGE) to the PoC client unit 701 and thus signals to the PoC client unit 701 that the user Friend_05 is no longer a current group member (remove_member_05). In step 711, the PoC client unit 701 uses a second MESSAGE message 717 (based on SIP MESSAGE) to confirm that the user Friend_05 is to be removed from the existing PoC session.

In step 712, the PoC control server computer 702 removes the departing PoC client unit 706 from the existing PoC session by virtue of the PoC control server computer 702 sending a BYE message 718 to the departing PoC client unit 706.

This is confirmed by the departing PoC client unit 706 in step 713 using a 200 OK message 719. Steps 712 and 713 are performed in conventional fashion, for example.

The user Friend_05 is then no longer part of the existing PoC session.

The text below refers to FIG. 8 and FIG. 9 to describe an exemplary embodiment for another instance of application, in which different signalling from the exemplary embodiments described above is performed.

FIG. 8 shows a message flow diagram 800 based on an exemplary embodiment of the invention.

In similar fashion to the exemplary embodiments described above, the message flow shown takes place between a PoC client unit 801, a PoC control server computer 802, a GM server computer 803, a location server computer 804, a presence server computer 805 and further PoC client units 806.

Two functional units of the PoC control server computer 802 are considered: a session controller 807 and a media mixer 808. The session controller 807 is responsible for the signalling tasks of the PoC control server computer 802, i.e. it performs the signalling operations which are to be performed by the PoC control server computer 802, for example signalling to invite a PoC client unit to join a PoC session. These signalling operations are performed on the basis of the SIP (Session Initiation Protocol). The media mixer 808 regulates the distribution of the communication data within the context of a PoC session to all the PoC client units participating in the PoC session.

In this exemplary embodiment, it is assumed that the PoC client unit 801 is the PoC client unit of a taxi control centre of a Berlin taxi company. A PoC group labelled "Taxis" can cover all the taxi drivers (equipped with a respective one of the further PoC client units 906). Each time the taxi control centre receives an order to transport a passenger, PoC communication needs to be started within a PoC session in progress, and all the taxi drivers (or the PoC client units they are using) who are in an x-kilometer radius of the passenger who is to be transported and who have set their presence status to "Taxi free" and are thus signalling that they are not currently transporting a passenger need to participate in the PoC communication.

As explained below, PoC communication within the PoC session is uniquely identified by an identifier and the participants in the PoC communication (who are a sub-group of the participants in the PoC session) interchange voice data (within the context of the PoC session and within the context of the PoC communication). Clearly, a plurality of PoC communications are set up in the course of a PoC session which exists throughout an entire day (between all taxi drivers and the taxi control centre), for example, and a plurality of voice messages with related contents are transmitted (between the participants in the respective PoC communication) during these PoC communications.

In comparison with the generation of a plurality of PoC sessions (one per order), the generation of a plurality of PoC communications (one for each incoming order) within a PoC session has the advantage that significantly lower signalling complexity is required.

First of all, a PoC session is set up (this step is not shown) in conventional fashion between the PoC client unit 801 and the further PoC client units 806, which, as mentioned, are the PoC client units of all the registered taxis, i.e. all the taxis which are currently in service (regardless of whether the taxis are free or occupied). This can be done in conventional fashion, for example as explained with reference to FIG. 1. For the rest, it is of no significance whether a "One-To-Many-To-One" topology is involved (i.e. the PoC client unit 801 receives communication data within the PoC session from all further PoC client units 806, but the further PoC client units 806 do not reciprocally receive communication data, i.e. receive no communication data from the respective other PoC client units from the further PoC client units 806) or a One-To-Many topology is involved (i.e. the PoC client units 801 and also the further PoC client units 806 receive all communication data from the further PoC client units 806, i.e. clearly everyone hears everyone).

In similar fashion to the exemplary embodiments described above, for example in similar fashion to steps 413 and 415 in FIG. 4, a first SUBSCRIBE-NOTIFY message pair 833 is interchanged between the GM server computer 803 and the location server computer 804 for each PoC client unit from the further PoC client units 806, so that, as described above with reference to FIG. 4, the location server computer 804 always signals the current location status of the further PoC client units 806 to the GM server computer 803.

Similarly, a second SUBSCRIBE-NOTIFY message pair 834 is interchanged between the GM server computer 803 and the presence server computer 805 in step 810, so that the GM server computer 803 is always informed by the presence server computer 805 about the current presence status of the further PoC client units 806, in similar fashion to the exemplary embodiments described above.

In step 811, a PoC session exists between the first PoC client unit 801 and the further PoC client units 806.

It is now assumed that the first order for transporting a passenger who is at Berlin's Alexanderplatz is received by the taxi control centre. The sequence steps below are now used by the PoC client unit 801 within the existing PoC session to set up a PoC communication with those of the further PoC client units 806 which
  are participating in the existing PoC session,
  are within a 3-km radius of Berlin's Alexanderplatz (in this example the first criterion), and
  whose presence status is "Taxi free" (in this example the second criterion).

These PoC client units from the further PoC client units 806 are subsequently called the PoC client units which are to participate.

In step 812, the PoC client unit sends a re-INVITE message 835 (in a form based on an SIP re-INVITE) with an appropriate content type (Application/Criteria+XML, cf. Table 2), which is used to specify the first criterion and the second criterion, to the PoC control server computer 802. In one embodiment, the re-INVITE message 835 contains a unique PoC communication identifier (PK_id_prop). In step 813, the PoC control server computer 802 generates a (its own) PoC communication identifier (PK_id). In step 814, the PoC control server computer 802 sends confirmation (clearly as a preliminary response) to the PoC client unit 801 in the form of a 183-session-processing message 836 (in a form based on SIP 183 session processing), which is also used to signal the PoC communication identifier PK_id.

By way of example, a PoC communication identifier is a port number which allows unique addressing of an application for application-specific data. In one embodiment, there are two PoC communication identifiers, for example a PoC communication identifier PK_id_prop on the part of the PoC client unit 801 and a PoC communication identifier PK_id on the part of the PoC control server computer 802.

In step 815, the PoC control server computer 802 sends a SUBSCRIBE message 837 to the GM server computer 803, which is used to signal the PoC communication identifier PK_id, the first criterion and the second criterion.

As explained above, the GM server computer 803 is always informed about the current location status and the current presence status of each PoC client unit from the further PoC client units 806. On the basis of this information, the GM server computer 803 ascertains all the PoC client units which are to participate, i.e. all the PoC client units from the further PoC client units 806 which meet the first criterion and the second criterion, in step 816.

The PoC client units 806 which are to participate are specified by the GM server computer in the current list of group members (current_member_list). In step 817, the GM server computer 803 sends a NOTIFY message 838 to the PoC control server computer 802, using it to signal the current list of group members, which is the current list of group members for the PoC communication, which is specified by the PoC communication identifier PK_id contained in the SUBSCRIBE message 837.

Steps 818 and 819 are performed optionally. In step 818, the PoC server computer 802 uses a first MESSAGE message 839 to signal to the PoC client unit 801 which PoC client units from the further PoC client units 806 meet the first criterion and the second criterion. In another embodiment, the PoC control server computer 802 signals only the number of PoC client units which are to participate, i.e. the number of further PoC client units 806 which meet the first criterion and the second criterion (#_of_members).

In step 819, the first PoC client unit 801 signals whether a PoC communication with the PoC client units which are specified by the current list of group members needs to be set up. In this example, it is assumed that no PoC communication with the PoC client units specified by the current list of group members needs to be set up. By way of example, the current list of PoC client units has the specification of 100 PoC client units, and the user in the taxi control centre decides that this is too many.

Accordingly, the PoC client unit 801 sends a second MESSAGE message 840 to the PoC control server computer 802 in step 819, specifying that no PoC communication with the PoC client units specified by the current list of group members needs to be set up (accept=no). In addition, the second MESSAGE message 840 contains modified criteria (criteria_update), for example the change in the first criterion that the PoC client units which are to participate must not be within three kilometers of Berlin's Alexanderplatz, but rather in a radius of one kilometer of Berlin's Alexanderplatz. In line with the modified criteria, a (new) current list of group members is ascertained in similar fashion to steps 815, 816 and 817, in particular a third SUBSCRIBE-NOTIFY message pair 841 is exchanged between the PoC control server computer 802 and the GM server computer 803.

In similar fashion to in step 818, the (new) current list of group members is signalled (not shown) to the PoC client unit 801. It is now assumed that a PoC communication needs to be set up with the PoC client units which are specified by the new current list of group members. Accordingly, the PoC client unit 801 sends a third MESSAGE message 842 to the PoC control server computer 802 in step 821, the PoC client unit 801 using this message to specify that a PoC communication with the PoC client units which are to participate (and which meet the modified criteria) needs to be set up (accept=yes).

Using a PK_start message 843, the session controller 807 signals to the media mixer 808 in step 822 that a new PoC communication has been generated within the existing PoC session. The PK_start message 843 contains the PoC communication identifier PK_id for the generated PoC communication and the current list of group members.

In step 823, the media mixer 808 confirms receipt of the PK_start message 843 using an OK message 844. In step 824, the PoC control server computer 802 responds to the re-INVITE message 835 by sending a 200 OK message 845.

In step 825, the PoC client unit 801 sends a Floor-Request message 846 to the PoC control server computer 802, requesting the floor, i.e. the right to send communication data, within the context of the generated PoC communication. The Floor-Request message 846 contains the PoC communication identifier PK_id for the generated PoC communication.

In step 826, a decision is made regarding whether the PoC client unit 801 is granted the floor; this can be decided by the session controller 807 or the media mixer 808, and therefore messages are possibly exchanged between the session controller 807 and the media mixer 804, or the Floor-Request message 846 is sent directly to the media mixer 808. It is assumed that the PoC client unit 801 is granted the floor. Accordingly, in step 827 the media mixer 808 or in step 828 the session controller 807, depending on which functional unit of the PoC control server computer 802 grants the floor, sends a Floor-Granted message 848 to the PoC client unit 801, which is used to grant the PoC client unit 801 the floor.

In step 829, the session controller 807 or in step 830 the media mixer 808 (depending on which functional unit of the PoC control server computer 802 grants the floor) sends a Floor-Taken message 849 to all PoC client units which can participate, signalling to the PoC client units which can participate, i.e. to the PoC client units from the further PoC client units 806 which are specified by means of the current list of group members, that the floor within the context of the PoC communication which is specified by the PoC communication identifier PK_id contained in the Floor-Taken message 849 has been allocated to the PoC client unit 801.

In step 831, the PoC client unit 801 now sends communication data 850 within the generated PoC communication specified by the PoC communication identifier PK_id to the media mixer 808 for forwarding to the PoC client units which can participate. In step 832, the media mixer 808 forwards the communication data 850 to the PoC client units which can participate, of which it has been informed beforehand in step 822.

When a further order is received in the taxi control centre, a further PoC communication is started, independently of the generated PoC communication, using a re-INVITE message in similar fashion to in step 812. In this way, the taxi control centre can conduct, for each order, a separate PoC communication, independent of the other orders, within the one existing PoC session.

By generating further PoC communications within the context of the existing PoC session, it is also possible to implement sub-group communications in parallel with group communications or within group communication, in which just some of the members of a group participate, for example "Whispering" or "Sidebars".

FIG. 9 shows a message flow diagram 900 based on an exemplary embodiment of the invention.

In similar fashion to the message flow described with reference to FIG. 8, the message flow shown in FIG. 9 takes place between a PoC client unit 901 (a taxi control centre), a PoC control server computer 902 having a session controller 907 and a media mixer 908, a GM server computer 903, a location server computer 904, a presence server computer 905 and further PoC client units 906 (belonging to taxi drivers).

The exemplary embodiment described below is a variant of the exemplary embodiment described with reference to FIG. 8.

Steps 909, 910 and 911 proceed in similar fashion to steps 809, 810 and 811.

In step 912, the PoC client unit 901 sends a Floor-Request message 934 to the PoC control server computer 902 instead of a re-INVITE message 835, as in step 812.

In steps 913 and 914, 916 and 917, if the media mixer 908 is regulating floor allocation, messages are exchanged between the session controller 907 and the media mixer 908.

Steps 915, 918 to 927 are performed in similar fashion to the messages 813 to 823 (in step 918, however, an OK message is transmitted, not a 183-session-processing message, as in step 814). In this exemplary embodiment, the 200 OK message 845 is not sent, which is the response to the re-INVITE message 835, of course, which is not sent in line with the message flow shown in FIG. 9. In addition, the Floor-Request message 846 is not sent, since the Floor-Request message 934 has already been sent in step 912. Similarly, step 826 is dispensed with. In similar fashion to steps 827 and 828, a Floor-Granted message 935 is sent to the PoC client unit 901 in steps 929 and 928, this being the response to the Floor-Request message 934. The further steps 930-933 proceed in similar fashion to steps 829-832.

In similar fashion to the sequences described with reference to FIG. 6 and FIG. 7, group members may join a group or leave a group in the embodiments shown in FIG. 8 and FIG. 9 too. This can be done in similar fashion to that with reference to FIG. 6 and FIG. 7 and is not explained in more detail.

FIG. 10 shows a message flow diagram 1000 based on an exemplary embodiment of the invention.

The message flow shown takes place between a PoC client unit 1001, a PoC control server computer 1002, a GM server computer 1003, a location server computer 1004, a presence server computer 1005 and further PoC client units 1006, which are arranged and configured as explained with reference to FIG. 3, with the second PoC client unit 302 and the third PoC client unit 303 corresponding to the further PoC client unit 1006.

In the exemplary embodiment explained below, it is assumed that the user of the PoC client unit 1001 wishes to start a PoC session with
    all his friends,
    who are currently in the same town as him (in this example this is a first criterion; criteria_1)
    and who are currently not working (in this example this is a second criterion; criteria_2).

To this end, the user of the PoC client unit 1001 sends a group_generation_request message 1023 in step 1007 to create a PoC group in the GM server computer 1003. To define the PoC group, the user transmits a listing (member_list) of twenty different users (the user's friends—these are the potential group members), which is held in the group_generation_request message 1023, and a first criterion (criteria_1) specified in the group_generation_request message 1023, that the friends must be in the town of Hamburg at the time at which the PoC group is used.

The group_generation_request message 1023 can be sent using an HTTP get instruction, for example, which is in the form shown in Table 1.

TABLE 1

GET http://glms.abc.de/script?action=create_group http/1.1
<?xml version="1.0"?>
<dynamic_group name="My friends in Hamburg">
    <member uri="sip:freund_01@web.de"/>
    <member uri="sip:freund_02@web.de"/>
    ...
    <member uri="sip:freund_20@web.de"/>
    <criteria>
        <location_criteria>
            <in_city name="Hamburg" satisfy="yes"/>
        </location_criteria>
    </criteria>
</dynamic_group>

HTTP get instructions are described in RFC "Hypertext Transfer Protocol—HTTP/1.1" (Group Management operations using HTTP are described in Push to Talk over Cellular (PoC); List Management and Do-not-Disturb; PoC Release 2.0).

In Table 1 and in the further tables, the entries which are additionally provided over the conventional messages, in line with the exemplary embodiments, are shown in bold.

In step 1008, the GM server computer 1003 responds by sending a group_generation_response message 1024 which contains a unique group identifier for the PoC group, in this case the identifier sip:myfriends@abc.de, to the PoC client unit 1001.

In step 1009, the user of the PoC client unit 1001 selects the PoC group and stipulates the second criterion (criteria_2) (the first criterion and the second criterion may each comprise a plurality of criteria), in order to use the PoC client unit 1001 to start a PoC session with the potential group members of the PoC group who meet the first criterion and the second criterion. The first criterion and the second criterion describe the PoC group dynamically, since over the course of time there may be a change in whether the potential group members, i.e. users shown in the list of users held in the group_generation_request message 1023, meet the first criterion and the second criterion.

The user of the PoC client unit 1001 wishes the current composition of the PoC group to be taken into account during the PoC session which is to be started. The PoC group is at any time currently made up of the potential group members who meet the first criterion and the second criterion. In particular, in the course of the PoC session, potential group members who have not participated in the PoC session to date need to be invited to join the PoC session if they meet the first criterion and the second criterion (in contrast to before). To achieve this, the user of the PoC client unit 1001 sets the automatic update flag (automatic_update_flag).

In step 1010, the user starts the PoC session by sending an INVITE message 1025 to the PoC control server computer 1002. The INVITE message 1025 is in a form based on an SIP INVITE. SIP INVITE is described in RF3261 "SIP: Session Initiation Protocol". The INVITE message 1025 contains a specification of the second criterion (criteria_2) and the specification that the automatic update flag has been set. By way of example, this is done by means of a content type which has a new definition over the prior art. The INVITE message 1025 is in the form shown in Table 2, for example.

TABLE 2

INVITE sip:myfriends@abc.de SIP/2.0
...
Content-Type: application/criteria+xml
Content-Length: (...)
<?xml version="1.0"?>
<criteria>
    <presence_criteria>
        <on_work satisfy="no"/>
    </presence_criteria>
    <automatic_update value="yes"/>
</criteria>

In step 1011, the PoC control server computer 1002, having received the INVITE message 1025, establishes that it needs to resolve the participant list for this PoC group, i.e. that it needs to determine from which group members the PoC group is currently made up.

Accordingly, the PoC control server computer 1002 transmits a group resolution request message (group resolve request) 1026 in step 1012 in order to ask the GM server computer 1003 to resolve the participant list for the group, i.e. to ascertain the group members from which the PoC group is currently made up. The group resolution request message 1026 contains the unique group identifier for the PoC group, in this case the identifier sip:myfriends@abc.de.

Upon receiving the group resolution request message 1026, the GM server computer 1003 responds to the PoC control server computer 1002 with the group's associated parameters which have been stipulated in the group_generation_request message 1023 (list of potential group members and/or criteria 1, maximum number of members in the group (optional), other service-specific parameters (optional)) using a group resolution response message 1027 (step 1013).

In a subsequent step 1014, the PoC control server computer 1002 ascertains all participants who are on the list of potential group members (if available) and who meet criteria_1 (if available) and criteria_2 (if available); these participants thus form the current member list (the way in which the PoC control server computer 1002 ascertains these participants is dependent on the criteria; see application examples described above).

Since the PoC control server computer 1002 requires the current location (location status) of the potential group members (or of the PoC client units used by the potential group members) in order to ascertain the current group members, the PoC control server computer 1002 sends a first SUBSCRIBE message 1028 (based on SIP SUBSCRIBE) to the location server computer 1004 in step 1015 in order to subscribe with the location server computer 1004 and to obtain information about the respective location status of the potential group members.

In addition, the PoC control server computer 1002 requires the information regarding whether the potential group members are currently working in order to ascertain the current group members. This information will be held for each potential group member in a presence information item (presence status) managed for this group member by the presence server computer 1005. Accordingly, the PoC control server 1002 sends a second SUBSCRIBE message 1029 to the presence server computer 1005 in step 1016. The first SUBSCRIBE message 1028 and the second SUBSCRIBE message 1029 are transmitted for each potential group member. This is shown by way of example in FIG. 10 for the first group member with the identifier sip:freund_01@web.de, which is held in the first SUBSCRIBE message 1028 and in the second SUBSCRIBE message 1029.

As mentioned, the first criterion is that the friends, i.e. the potential group members, need to be in the town of Hamburg. Alternatively, the first criterion may also be a location criterion which is dependent on the location of the user (or of the PoC client unit 1001). By way of example, the first criterion might be that only potential group members who (or whose PoC client units) are in a 5-km radius of the position of the user or of the PoC client unit 1001 belong to the group. In this case, the PoC control server computer 1002 also needs the location information for the user of the PoC client unit 1001 in order to ascertain the current group members, and accordingly sends the first SUBSCRIBE message 1028 to the location server computer 1004 not just respectively for all potential group members, but also for the user of the PoC client unit 1001. Subsequently, however, it is assumed that the first criterion is that the group members need to be in the town of Hamburg.

The first SUBSCRIBE message 1028, which, as mentioned, is respectively transmitted to the location server computer 1004 for each potential group member, is answered by the location server computer 1004 in step 1017 using a respective first NOTIFY message 1030 containing the location status of the respective group member (for example location_status_01).

Similarly, in step 1018, the second SUBSCRIBE message 1029, which may be sent to the presence server computer 1005 for each group member, is respectively answered by the presence server computer 1005 by transmitting a second NOTIFY message 1031 to the PoC control server computer 1002. The second NOTIFY message 1031 contains the information for the respective potential group member regarding whether the respective potential group member is currently working (for example presence_status_01).

Possibly using the information transmitted to it in step 1017 and step 1018, the PoC control server computer 1002 ascertains the current group members in step 1019 by checking, for each potential group member, whether the potential group member meets the first criterion and the second criterion.

As a result, the PoC control server computer 1002 has information about which users are current group members. Optionally, steps 1020 and 1021 are now also performed. In step 1020, the PoC control server computer 1002 sends the list of current group members (current_member_list)—in another embodiment just the indication of the number of the current group members—to the PoC client unit 1001 using a first MESSAGE message 1032. The first MESSAGE message 1032 is in the form of SIP MESSAGE. SIP MESSAGE is described in RFC3428 "Session Initiation Protocol (SIP) Extension for Instant Messaging".

In step 1021, the PoC client unit 1001 responds using a second MESSAGE message 1033, which is likewise in a form based on SIP MESSAGE and, in this example, specifies that the PoC session with the current group members actually needs to be started.

In step 1022, the PoC control server computer 1002 sends a second INVITE message 1034 to all the current group a members, in this example to all further PoC client units 1006. The second INVITE message 1034 is in the form of SIP INVITE. Clearly, step 1022 is an invitation to all further PoC client units 1006 to join the PoC session which is to be set up. This is done in conventional fashion. In response, the further PoC client units 1006 each send a first 200 OK message 1035 (based on SIP 200 OK) to the PoC control server computer 1002 (step 1036).

By sending the first 200 OK message 1035, a respective PoC client unit from the further PoC client units 1006 (or the relevant users) accepts the invitation to join the PoC session which is to be set up. When the PoC control server computer 1002 has received the first 200 OK message 1035 (i.e. as soon as one of the current group members has accepted the invitation to join the PoC session), the PoC control server computer 1002 produces a second 200 OK message 1037 and sends it to the PoC client unit 1001, the second 200 OK message 1037 signalling that one of the current group members has accepted the invitation to join the PoC session.

The PoC session now runs with all the friends of the user of the PoC client unit 1001 who meet the first criterion and the second criterion (and have accepted the invitation to join the PoC session).

If the automatic update flag was set in the first INVITE message 1025, the PoC control server computer 1002 now continues to observe whether a previous group member no longer meets the criteria or a new participant does meet the criteria in the mean time, so that it is always aware of the current composition of the group and so that it can cancel or extend the invitation to the group members as appropriate.

In another embodiment, the communication service within which the invention is being used is the "IMS Conferencing" specified by 3GPP (3rd Generation Partnership Project). This is a conference communication service which is based on the IMS (Internet Protocol based Multimedia Subsystem) architecture. In this case, the functionality of a GM server computer is covered by a conference policy server. A conference policy server manages the rules and statuses which are used within a conference, using a conference policy document.

In this embodiment, a conference client unit sends criteria, according to which a group of conference participants is to be dynamically created, on the basis of CPCP (Conference Policy Control Protocol) to the conference policy server, which stores the criteria in an appropriate format in the conference policy document. In one embodiment, the conference policy server records both the criteria and the list of current group members in the conference policy document. Information required for producing the list of current group members (for example presence information and location information, as above) is ascertained by the conference policy server in similar fashion to in the exemplary embodiments described above.

The exemplary embodiments explained above have dealt only with the use case in which possible participants (or corresponding client units) are invited to join a communication service (for example a PoC session) when (or as soon as) they meet prescribable criteria.

However, the invention can also be used when possible participants (or corresponding client units) are not invited but rather actively need to dial up themselves, i.e. need to initiate their participation themselves. One example of this is a chat session (or PoC session), which users need to access themselves.

By way of example, a user wishes to use a client unit which he is using to dial up a PoC control server computer which is providing a PoC session, for example by sending a dialup message based on SIP INVITE, in order to be able to participate in the PoC session. In similar fashion to in the exemplary embodiments above, criteria are stipulated and the PoC control server computer checks, for example by asking a GM server computer in a similar fashion to above, whether the user who wishes to dial up meets the stipulated criteria. Only if the user (or the client unit he is using) meets the criteria is a dialup accepted and confirmed (for example in line with SIP 200 OK), and the user is then a participant in the PoC session. If the user does not meet the criteria, the dialup message receives a rejection response, for example using a rejection message based on SIP REJECT, which may also contain an indication for the reason for the rejection, and a user does not become a participant in the PoC session.

The invention claimed is:

1. A communication system comprising:
   a communication service client terminal to generate:
   a first one or more messages that contain at least one first criterion that is respectively met or not met by each of a plurality of further communication service client terminals, and
   after reception of an identifier for a group including one or ore of the further communication service client terminals that meet the at least one first criterion, a second one or more messages that contain at least one second criterion, different from the at least one first criterion, that is respectively met or not met by each of the plurality of further communication service client terminals, the second one or more messages further containing a request for provision of a communication service and a specification that the further communication service client terminals that meet the at least one first criterion and the at least one second criterion can be participants in the communication service provided; and
   a server computer configured to:
   generate, in response to the first one or more messages, the identifier for the group including the one or more of the further communication service client terminals that meet the at least one first criterion, and
   dynamically generate, in response to the second one or more messages and during an establishment of a communication session of the communication service between the communication service client terminal and the further communication service client terminals that meet the at least one first criterion and the at least one second criterion or during a running communication session of the provided communication service between the communication service client terminal and the further communication service client terminals that meet the at least one first criterion and the at least one second criterion, information describing the further communication service client terminals that meet the at least one first criterion and the at least one second criterion and can be participants in the communication session of the communication service provided,
   check, in the course of providing the communication session of the communication service, the validity of the information, and
   update the information in response to changes in the further communication service client terminals that meet the at least one first criterion and the at least second criterion;
   wherein a communication service server computer is to provide the communication session of the communication service between the communication service client terminal and the further communication service client terminals that meet the at least one first criterion and the at least one second criterion as participants on the basis of the information, and to alter the participants in the communication session of the communication service provided on the basis of the updated information.

2. The communication system according to claim 1, wherein the communication service is a communication service which is based on SIP.

3. The communication system according to claim 1, wherein the server computer is to store the at least one criterion.

4. The communication system according to claim 1, wherein the at least one criterion is specified by XML data in the first one or more messages.

5. The communication system according to claim 1, wherein the request and the at least one first criterion are included in different messages of the first one or more messages and are transmitted from the communication service client terminal to the communication service server computer.

6. The communication system according to claim 1, wherein generate a second one or more messages that contain at least one second criterion comprises generate an invite message that contains the at least one second criterion.

7. The communication system according to claim 6, wherein the communication service client terminal is further to transmit the invite message to the communication service server computer.

8. The communication system according to claim 1, wherein the server computer is further to generate dynamically information of the further communication service client terminals that meet the at least one first criterion and the at least one second criterion by transmission, to at least one information server unit, of a message that contains a request for information that is required for checking whether individual ones of the further communication service client terminals meet the at least one second criterion.

9. The communication system according to claim 8, wherein the information server unit is a presence server unit or a location server unit.

10. The communication system according to claim 1, wherein the communication service is a service selected from the group consisting of: a PoC service, a communication service for sending instant messages, an MMS communication service, and a conference communication service.

11. One or more non-transitory computer readable media having instructions thereon that, in response to execution by one or more processing devices of a communication service client terminal, cause the communication service client terminal to:
   generate a first one or more messages that contain at least one first criterion that is respectively met or not met by each of a plurality of further communication service client terminals;
   receive an identifier for a group including one or more of the further communication service client terminals that meet the at least one first criterion;
   in response to reception of the identifier, generate a second one or more messages that contain at least one second criterion, different from the at least one first criterion, that is respectively met or not met by each of the plurality of further communication service client terminals, the second one or more messages further containing a request for provision of a communication service and a specification that the further communication service client terminals that meet the at least one first criterion and the at least one second criterion, during an establishment of a communication session of a communication service or during a running communication session of the communication service, can be participants on a dynamic basis in the communication session of the communication service; and send a request for checking, in the course of the communication session of the communication service, the validity of information describing the further communication service client terminals that meet the at least one first criterion and the at least one second criterion and that participate in the communication session of the communication service.

12. The one or more computer readable media according to claim 11, wherein the request for checking is part of the one or more first messages or the one or more second messages generated by the communication service client terminal.

13. The one or more computer readable media according to claim 11, wherein send the request for checking is includes send an automatic update flag.

14. A communication service client terminal comprising circuitry to:
   generate:
      a first one or more messages that contain at least one first criterion that is respectively met or not met by each of a plurality of further communication service client terminals, and
      after reception of an identifier for a group including one or more of the further communication service client terminals that meet the at least one first criterion, a second one or more messages that contain at least one second criterion, different from the at least one first criterion, that is respectively met or not met by each of the plurality of further communication service client terminals, the second one or more messages further containing a request for provision of a communication service and a specification that the further communication service client terminals that meet the at least one first criterion and the at least one second criterion during an establishment of a communication session of a communication service or during a communication session of the communication service, can be participants on a dynamic basis in the communication session of the communication service provided; and
   send a request for checking, in the course of the communication session of the communication service, the validity of information describing the further communication service client terminals that meet the at least one first criterion and the at least one second criterion and that participate in the communication session of the communication service.

15. The communication service client terminal according to claim 14, wherein send the request for checking comprises send an automatic update flag.

16. The communication service client terminal according to claim 14, wherein the request for checking is included in the first one or more messages or the second one or more messages generated by the communication service client terminal.

17. The communication service client terminal according to claim 14, wherein generate a second one or more messages that contain at least one second criterion comprises generate an invite message that contains the at least one second criterion.

18. The communication system according to claim 17, wherein the communication service client terminal is further to transmit the invite message to the communication service server computer.

19. A method for operating a communication service client terminal in a communication system having a plurality of further communication service client terminals, a communication service server computer, and a server computer, wherein the method comprises:
   the communication service client terminal generating a first one or more messages that contain at least one first criterion that is respectively met or not met by each of the plurality of further communication service client terminals;
   the communication service client terminal receiving an identifier for a group including one or more of the further communication service client terminals that meet the at least one first criterion;
   the communication service client terminal, in response to receiving the identifier, generating a second one or more messages that contain at least one second criterion, different from the at least one first criterion, that is respectively met or not met by each of the plurality of further communication service client terminals, the second one or more messages further containing a request for provision of a communication service and a specification that the further communication service client terminals that meet the at least one first criterion and the at least one second criterion, during an establishment of a communication session of a communication service or during a running communication session of the communication service, can be participants on a dynamic basis in the communication session of the communication service;
   the communication service client terminal sending a request for checking, in the course of the communication session of the communication service, the validity of information describing the further communication service client terminals that meet the at least one first criterion and the at least one second criterion and that participate in the communication session of the communication service.

20. The method according to claim 19, wherein sending the request for checking is includes sending an automatic update flag.

21. The method according to claim 19, wherein the request for checking is part of the one or more first messages or the one or more second messages generated by the communication service client terminal.

22. The method according to claim 19, wherein generating a second one or more messages that contain at least one second criterion comprises generate an invite message that contains the at least one second criterion.

23. The method according to claim 22, further comprising:
   the communication service client terminal transmitting the invite message to the communication service server computer.

* * * * *

UNITED STATES PATENT AND TRADEMARK OFFICE
CERTIFICATE OF CORRECTION

PATENT NO. : 8,892,747 B2  
APPLICATION NO. : 13/926271  
DATED : November 18, 2014  
INVENTOR(S) : Josef Laumen et al.

Page 1 of 1

It is certified that error appears in the above-identified patent and that said Letters Patent is hereby corrected as shown below:

In the claims

Column 31, line 19 (Claim 1): Replace "or ore" with --or more--;

Column 33, line 17 (Claim 13): Delete "is"; and

Column 34, line 46 (Claim 20): Delete "is".

Signed and Sealed this  
Twenty-second Day of March, 2016

Michelle K. Lee  
*Director of the United States Patent and Trademark Office*